(12) United States Patent
Walsh

(10) Patent No.: US 11,270,071 B2
(45) Date of Patent: Mar. 8, 2022

(54) LANGUAGE-BASED CONTENT RECOMMENDATIONS USING CLOSED CAPTIONS

(71) Applicant: Comcast Cable Communications, LLC, Philadelphia, PA (US)

(72) Inventor: Richard Walsh, Sunnyvale, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 120 days.

(21) Appl. No.: 15/856,585

(22) Filed: Dec. 28, 2017

(65) Prior Publication Data

US 2019/0205373 A1 Jul. 4, 2019

(51) Int. Cl.
*G06F 16/9535* (2019.01)
*G06F 40/263* (2020.01)
*H04N 21/435* (2011.01)
*G06F 40/205* (2020.01)
*G06F 40/279* (2020.01)

(52) U.S. Cl.
CPC ........ *G06F 40/263* (2020.01); *G06F 16/9535* (2019.01); *G06F 40/205* (2020.01); *G06F 40/279* (2020.01); *H04N 21/435* (2013.01)

(58) Field of Classification Search
CPC .................................................. G06F 17/275
USPC ............................................................ 704/9
See application file for complete search history.

(56) References Cited

U.S. PATENT DOCUMENTS

| | | | | |
|---|---|---|---|---|
| 4,809,334 A * | 2/1989 | Bhaskar | ................. | G10L 25/90 704/207 |
| 6,029,195 A * | 2/2000 | Herz | ...................... | G06Q 30/02 725/116 |
| 8,131,555 B1 * | 3/2012 | Carriere | ................. | G06Q 30/02 704/270.1 |
| 9,584,946 B1 * | 2/2017 | Lyren | ................... | H04M 1/0202 |
| 9,704,480 B2 * | 7/2017 | Tateno | ................... | G06Q 30/02 |
| 9,788,777 B1 * | 10/2017 | Knight | ................... | A61B 5/165 |
| 10,573,312 B1 * | 2/2020 | Thomson | ............... | G10L 15/30 |
| 2004/0012613 A1 * | 1/2004 | Rast | ..................... | G11B 27/105 345/632 |
| 2004/0030550 A1 * | 2/2004 | Liu | ......................... | G10L 15/26 704/231 |
| 2004/0098743 A1 * | 5/2004 | Gutta | .................... | H04N 21/454 725/46 |
| 2006/0173916 A1 * | 8/2006 | Verbeck Sibley | ...... | G06F 16/48 |
| 2007/0008956 A1 * | 1/2007 | Moran | ..................... | H04L 43/00 370/352 |
| 2008/0046241 A1 * | 2/2008 | Osburn | .................. | G10L 17/26 704/250 |
| 2008/0091423 A1 * | 4/2008 | Roy | ........................ | G10L 15/26 704/235 |
| 2008/0170676 A1 * | 7/2008 | Douma | ................. | H04M 15/00 379/114.13 |

(Continued)

*Primary Examiner* — Jakieda R Jackson
(74) *Attorney, Agent, or Firm* — Banner & Witcoff, Ltd.

(57) ABSTRACT

Systems, apparatuses, and methods are described herein for providing language-level content recommendations to users based on an analysis of closed captions of content viewed by the users and other data. Language-level analysis of content viewed by a user may be performed to generate metrics that are associated with the user. The metrics may be used to provide recommendations for content, which may include advertising, that is closely aligned with the user's interests.

28 Claims, 9 Drawing Sheets

(56) References Cited

U.S. PATENT DOCUMENTS

| | | | | |
|---|---|---|---|---|
| 2009/0245479 A1* | 10/2009 | Surendran | H04M 3/4878 | 379/70 |
| 2010/0198598 A1* | 8/2010 | Herbig | G10L 15/07 | 704/240 |
| 2010/0251304 A1* | 9/2010 | Donoghue | H04N 5/44543 | 725/46 |
| 2011/0093337 A1* | 4/2011 | Granit | G06Q 30/0269 | 705/14.53 |
| 2011/0135278 A1* | 6/2011 | Klappert | G06F 17/241 | 386/278 |
| 2011/0145040 A1* | 6/2011 | Zahn | G06F 16/735 | 705/7.33 |
| 2011/0251843 A1* | 10/2011 | Aronowitz | G06N 7/005 | 704/235 |
| 2012/0084292 A1* | 4/2012 | Liang | G06F 16/957 | 707/741 |
| 2012/0101806 A1* | 4/2012 | Davis | G06Q 30/02 | 704/9 |
| 2012/0317046 A1* | 12/2012 | Myslinski | G06Q 10/10 | 705/329 |
| 2013/0060763 A1* | 3/2013 | Chica | G06F 17/27 | 707/723 |
| 2013/0124979 A1* | 5/2013 | Chang | G06F 17/218 | 715/243 |
| 2014/0032326 A1* | 1/2014 | Li | G06Q 30/0261 | 705/14.58 |
| 2014/0164507 A1* | 6/2014 | Tesch | H04L 51/10 | 709/204 |
| 2014/0201631 A1* | 7/2014 | Pornprasitsakul | G11B 27/031 | 715/716 |
| 2014/0223462 A1* | 8/2014 | Aimone | H04N 21/4788 | 725/10 |
| 2014/0298364 A1* | 10/2014 | Stepanov | H04N 21/4758 | 725/10 |
| 2015/0020086 A1* | 1/2015 | Chen | H04N 21/44008 | 725/12 |
| 2015/0194155 A1* | 7/2015 | Tsujikawa | H04N 21/42203 | 704/246 |
| 2015/0286619 A1* | 10/2015 | Chakra | G06F 17/28 | 704/9 |
| 2015/0312649 A1* | 10/2015 | Gopalan | H04N 21/458 | 725/32 |
| 2015/0339712 A1* | 11/2015 | Koutrika | G06N 5/048 | 705/14.53 |
| 2015/0382052 A1* | 12/2015 | Pearlman | H04N 21/44222 | 725/46 |
| 2016/0035346 A1* | 2/2016 | Chengalvarayan | G10L 15/07 | 704/246 |
| 2016/0063596 A1* | 3/2016 | Landau | G06Q 30/0631 | 705/26.7 |
| 2016/0078471 A1* | 3/2016 | Hamedi | H04L 67/1072 | 705/14.41 |
| 2016/0112760 A1* | 4/2016 | Kosseifi | H04N 21/44227 | 725/28 |
| 2016/0125085 A1* | 5/2016 | Vasudevan | G06F 16/9535 | 707/734 |
| 2016/0180840 A1* | 6/2016 | Siddiq | G10L 15/1815 | 704/257 |
| 2016/0189712 A1* | 6/2016 | Steelberg | G10L 15/26 | 704/235 |
| 2016/0253710 A1* | 9/2016 | Publicover | H04N 21/2668 | 705/14.66 |
| 2016/0274744 A1* | 9/2016 | Neumann | H04N 21/47202 | |
| 2017/0006338 A1* | 1/2017 | Kim | H04N 21/475 | |
| 2017/0213243 A1* | 7/2017 | Dollard | G06Q 30/0249 | |
| 2017/0213247 A1* | 7/2017 | Balasubramanian | G06Q 30/0241 | |
| 2017/0228803 A1* | 8/2017 | Dollard | G06Q 30/0601 | |
| 2017/0364516 A1* | 12/2017 | Shellef | G10L 15/24 | |
| 2018/0089513 A1* | 3/2018 | Cremonesi | G06K 9/52 | |
| 2018/0098101 A1* | 4/2018 | Pont | H04N 21/4147 | |
| 2018/0144052 A1* | 5/2018 | Sayyadi-Harikandehei | H04N 21/231 | |
| 2018/0302687 A1* | 10/2018 | Bhattacharjee | H04N 21/4884 | |
| 2019/0147487 A1* | 5/2019 | Lee | G06Q 30/0239 | 705/14.73 |
| 2019/0156826 A1* | 5/2019 | Cromack | G06F 16/3334 | |

\* cited by examiner

LANGUAGE-BASED CONTENT RECOMMENDATIONS USING CLOSED CAPTIONS

BACKGROUND

Content delivery systems may include a large amount of content. Content may be stored in a variety of locations, such as locally, remotely, or across a network. With a larger and growing amount of content, users may be required to sift through many options to find content of interest.

SUMMARY

The following summary is not intended to limit or constrain the detailed description. The following summary merely presents features in a simplified form as a prelude to the more detailed description provided below.

Systems, apparatuses, and methods are described to provide language-based content recommendations using closed captions so that content delivery systems may provide recommendations for content that are closely aligned with a user's interests. Closed caption data of content that is selected or viewed may be analyzed to generate metrics that may be indicative of the characteristics of the content viewed and, in turn, the viewer. For example, complex aspects of the caption data such as reading level, sentence length, and frequency of occurrences of certain words or phrases, may be analyzed. Other data determined from various sources such as an audio channel associated with the content, user inputs (e.g., remote control, voice commands, other user device inputs), or video of the content also may be analyzed to identify certain characteristics of the content indicative of the viewer. These characteristics may be applied in generating or updating metrics. Metrics may include any type of metric, including language-level metrics described further below, that may relate to linguistic characteristics of content. Metrics may be associated with a user or group of users, or may be associated with content selected or viewed by a user or group of users. For example, metrics may be associated with a user and then used to determine additional content, such as content listings or content assets, that is more likely to be of interest to the user than other content based on determined characteristics of the user. With each subsequent content that is selected or viewed, metrics may be updated based on the subsequent content to provide improved metrics, and thus, provide content recommendations that may be personalized to the user and that are more closely aligned with the user's interests.

A data stream for a display device may be transmitted by a computing device, where the data stream comprises content and caption data associated with the content. Indications of one or more portions of the content a user may select or view may be received, and metrics may be determined based on the caption data associated with those portions of content. The metrics may be used to determine recommendations for additional content, where the additional content is correlated with the selected or viewed portion of content based on the metrics.

The above summary is not an exhaustive listing of the novel features described herein, and are not limiting of the claims. These and other features are described in greater detail below.

BRIEF DESCRIPTION OF THE DRAWINGS

These and other features of the present disclosure will become better understood with regard to the following description, claims, and drawings. The present disclosure is discussed by way of example, and not limited by, the accompanying figures in which like numerals indicate similar elements.

DETAILED DESCRIPTION

In the following description of the various examples, reference is made to the accompanying drawings identified above, which form a part hereof, and in which are shown various examples of the disclosure. Other examples may be utilized, and structural and functional modifications may be made, without departing from the scope discussed herein. Various features are capable of being practiced or being carried out in various different ways.

Various features are described herein that allow for content recommendations using closed captions or other data. Recommendations may be for subsequent content relating to content previously selected or viewed by a user as well as content that is more closely aligned with a user's interests than other known methods. Closed caption data of content that is selected or viewed may be analyzed to generate language-level metrics (e.g., based on content, and may also be referred to as content metrics) and viewing metrics (e.g., based on users, devices for displaying content, or both) that are indicative of various complexities of the content, e.g., reading level, sentence length, frequency of occurrences of certain words or phrases, or other language-level element. Language-level characteristics of caption data that are indicative of various complexities of associated content may generally be referred to as linguistic characteristics. The metrics may be updated based on subsequent content selected or viewed to provide content recommendations to the user that may be personalized and are more closely aligned with the user's interests. As a result, a user may be more likely to select or view recommended content, or have a higher level of satisfaction with services associated with the content or its delivery. Moreover, a higher level of satisfaction may result from recommendations being more likely to include greater diversity of content, whereby the disclosed content recommendations may identify content of which a user or group of users may otherwise would have been unaware. Content comprising advertisements may be more successful in reaching target audiences, and thus, more effective in achieving its goals. Systems, apparatuses, and methods described herein are particularly advantageous for content delivery systems, such as within a cable infrastructure, although it may also benefit and be applied to any other system or infrastructure. Further, the disclosed systems, apparatuses, and methods for providing content recommendations may be combined with any other content recommendation system, e.g., to increase the diversity of content recommendations.

Figure 1:
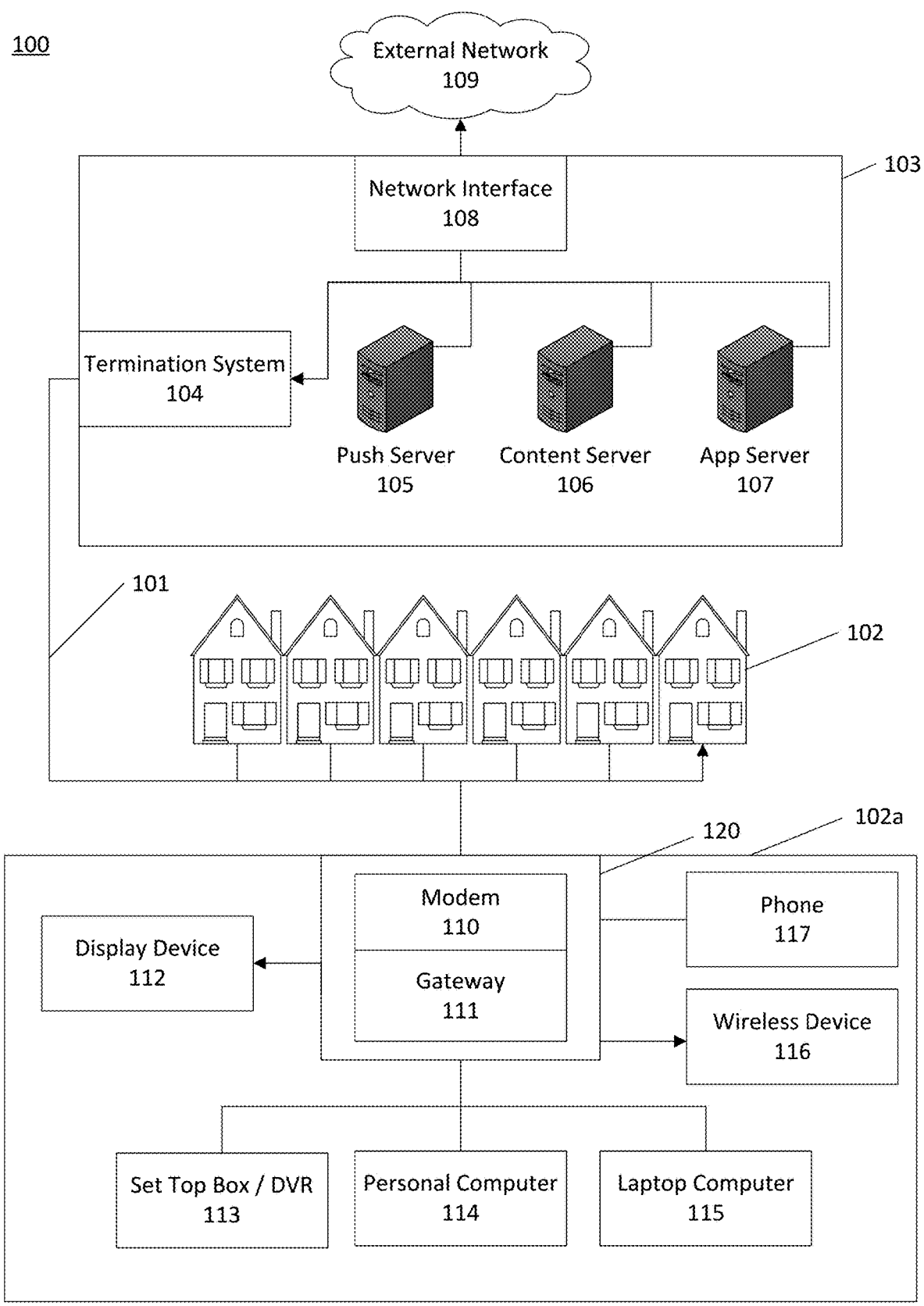
FIG. 1 shows an example of a content delivery system.

FIG. 1 shows an example of a content (e.g., data, media, information, services, etc.) distribution network 100 on which many of the various features described herein may be implemented. The network 100 may be any type of information distribution network, such as satellite, telephone, cellular, wired or wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103 (e.g., a headend, a processing facility, etc.). The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not shown, such as splitters, filters, amplifiers, etc. to help convey the signal clearly, but in general each split introduces a bit of signal degradation. The lines 101 may include any type of device used to transmit or receive content, including but not limited to, a gateway, server, router, optical node, backbone, fiber ring, etc. Portions of the lines 101 may also be implemented with fiber-optic cable, while other portions may be implemented with coaxial cable, other lines, or wireless communication paths.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. A local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). Homes connected to a termination system (TS), such as a modem termination system (MTS), may form a local premises access network.

The central office 103 may include a termination system (TS) 104, such as a cable modem termination system (CMTS) in an example of a HFC-type network, which may be a computing device configured to manage communications between devices on the network of lines 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The central office 103 may also include one or more network interfaces 108, which may permit the central office 103 to communicate with various other external networks 109. These networks 109 may include, for example, Internet Protocol (IP) networks having Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones 117.

As noted above, the central office 103 may include a variety of servers 105-107 that may be configured to perform various functions. The central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, closed caption data, etc. The content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111, such as a combined modem and gateway interface device 120. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other computing devices, including those in or remote to the home (e.g., user devices), such as televisions or other display devices 112 (e.g., media players, monitors, etc.), additional STBs or DVRs 113, personal computers 114, laptop computers 115, wireless devices 116 (e.g., wireless laptops netbooks, tablets, media players, monitors, DVRs, mobile phones, mobile televisions, personal digital assistants (PDA), etc.), and any other desired wired or wireless devices. In particular, these devices may include any type of content device configured to receive, decode, demodulate, decrypt, transmit, display, play, record, and/or store content, such as audio, video, data, or any combination thereof. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and any other interface.

An example of language-level content recommendations is described with respect to FIG. 1, as follows. A user in a content delivery system in network 100 may make a request for content or otherwise receive content, such as via a content device (e.g., 112-117) at or near a premise 102a. Content may include any content in a content delivery system, such as a linear content, non-linear content, live content, stored content, on-demand content. Examples of content may include a television program, live or previously recorded broadcast, movie, Video On Demand ("VOD"), live or previously recorded streaming content, still images, advertisements, Digital Video Recorder ("DVR") content including previously stored content, data, and any other type of content requested by, or delivered to, a user in a content delivery system. The requested or received content may be from a content source at a central office or headend 103 (e.g., from the servers 105-107) via the lines 101, and may be included among received data, such as in the form of a data stream. The data stream may include content, caption data, as well as any other data. Caption data may comprise a textual transcript of spoken words in the audio of a program, subtitles for foreign language content items, director commentary, and textual indications of characteristics of the audio or video such as indications of music, speaker changes, location information, and any other data related to the content item.

A content delivery system in network 100 may perform analysis of caption data, as follows. A device in the network 100, including, e.g., a device at the central office 103, in an external network 109, on the network of lines 101, or at or near a user premise 102a, analyzes caption data or other data corresponding to requested or received content. Caption and other data analysis may be performed before the content is requested, e.g., before or after it is stored in a central office 103 or an external network 109. Additionally or alternatively, caption data analysis may be performed after the content is requested, e.g., by a central office 103 or an external network 109 upon or after receiving a request for content or around the time of transmitting content via the network of lines 101, or by the content device (e.g., 112-117) at or near a user premise 102a or another device in the network 100 upon or after receiving the content. Caption and other data analysis also may be in real-time or near real-time, e.g., for live streaming content. After analyzing the data, one or more metrics may be generated based on the analysis, and the metrics may be transmitted to any other device or devices in the network 100 (e.g., at a central office 103, on the network of lines 101, or at or near a user premise 102a).

An example of language-level analysis of data such as caption data is described as follows. Language-level content recommendations may be based on one or more metrics at a linguistic, or language, level. Language-level metrics may be based on alphanumeric or other text that may be included in closed captions, or other data that may be converted to a language-level, such as audio, user input, or video, as described further herein. Language-level metrics may include reading level and complexity of content. Reading level may be based on length of sentences, length of words, vocabulary level of words (e.g., advanced vocabulary words included in a predetermined list of advanced vocabulary words that may be indicative of post-high school or post-college education, or a lack of advanced vocabulary words that may be indicative of grade-school level education), presence or absence of words or phrases (e.g., people, places, or things), punctuation or symbols within text, presence or absence of contractions, and any other linguistic characteristic that may be used to indicate a reading level of text.

A reading level may be a number on a scale of 1 to 10, or any other numerical scale. Content that includes advanced vocabulary words, e.g., 0.5, 1, 2, or 3 per sentence, and/or that has an above average sentence length, e.g., 15, 20, 25, or 30 or more words, may indicate a high complexity level of the content. Similarly, content that includes only basic vocabulary words, and/or that have a below average sentence length, e.g., less than 15, 12, 10, or 8 words per sentence, may indicate a low complexity of the content. A complexity level, e.g., 0, 1, 2, 3, . . . 100, and up to any number, may be determined for content and may be based on vocabulary words, sentence length, and/or any of the characteristics used to determine reading level. Content such as a historical documentary and a college level mathematics VOD program may both have a reading level of 9 or 10 based on common structure and length of sentences, but based on the inclusion of advanced mathematic vocabulary in the VOD program it may have a higher complexity level (e.g., 90 to 100 on a scale of 1 to 100) than the complexity level of the documentary (e.g., 60-70 on a scale of 1 to 100).

The language-level metrics may additionally or alternatively include frequency of occurrences of certain words, phrases, or other items in the content, such as named entities or proper nouns (e.g., persons, organizations, and locations), presence or absence of predetermined phrases (e.g., "Hey," "Like, seriously?," "no way," etc.), predetermined phrases involving profanity, caption metadata signals (e.g., "[Cheers and Applause]," nearby text that may provide additional information relating to a musical note or other symbolic indicator (e.g., "♪: classical" may indicate that classical music is being played, and text neighboring "@" may provide added details for a reference to social media, a website, or an e-mail address), speaker change indicator (e.g., ">>")), web addresses, hashtags, currency amounts, dates, and any combination of letters, numbers, characters, and indicators. Additionally or alternatively, the presence of a symbolic indicator may trigger other processes to identify information for inclusion in language-level analysis. A musical symbol (e.g., "♪") may trigger the sensing or recording, e.g., via a microphone or a digital signal processor, of the audio (e.g., background music, soundtrack, etc.) and subsequent analysis of the audio may be performed to determine textual information about the music. In response to identification of the presence of music, such as via the detection of a musical symbol, a music application may be used to identify and/or determine information about the music (e.g., composer, performer, song title, album title, year, musical category, lyrics, etc.). Language-level analysis may include analysis of the information about the music.

Non-English symbols, letters, or punctuation that may be indicative of a non-English language may trigger language applications used to determine the language of content, and subsequently perform language-level analysis according to the determined language. Some of these and other non-exhaustive examples of language-level elements that may be included in analyses for generating language-level metrics are described further below with respect to Table 2. By analyzing caption data associated with content, metrics may be created that reflect a signature or inherent nature of the content viewed or selected for viewing. Content recommendations that are based on these metrics may be personalized and may have strong correlation with a user's interests.

In addition or in the alternative to determining information about content, language-level metrics based on caption data may provide information about likely intended audiences for particular content. For example, content that has a high frequency of changing speakers in associated caption data may indicate a higher likelihood that its intended audience may be adults as opposed to children. Or, if caption data includes profanity, it would be a very strong indication that the intended audience is not children. Alternatively, if caption data indicates few speaker changes, a lack of advanced vocabulary words, and short sentences, the associated content is more likely to be intended or suitable for children. Occurrences of certain slang words or phrases could indicate an intended audience of teens, or people from different regions of a country. Language-level metrics also may be directed to language (e.g., English, Spanish, French, German, etc.), ethnicity, age, gender, level of education, geographical categories (such as rural, urban, states, cities, towns, regions), schools, employment status or level, frequency of viewing, time of day during viewing, and any other category for classifying a likely content viewer. If a user selects or views content indicating language-level metrics from a particular category or categories, then subsequent content from the same category or categories may be recommended or provided to that user based on a viewing metric associated with the user, a device for displaying content, or both.

The language-level metrics may provide content recommendations even if errors are present in caption data associated with content. Unlike recommendations based on predefined genre or title, which may result in inaccurate recommendations if relatively small errors occur, language-level metrics may be less impacted by errors. It is not uncommon for caption data to include some errors, such as misspellings, incorrect words or phrases, misplaced text or other characters, dropped characters, and misidentified speakers. However, language-level metrics may accommodate errors through the use of signatures. Signatures may be generated from language-level metrics that identify categories, groups, or common characteristics of content. An episode of a particular television series may have characteristics such as words, phrases, complexity level, or any other characteristic that are very similar to another episode of the same television series. Language-level metrics for each episode may be combined to generate a signature for the television series. Similarly, a broadcast of a baseball game may have certain characteristics in common with other sports broadcasts (e.g., similar number of speakers, average sentence length, frequency of exclamations, and identification of crowd noise in each of football, basketball, and soccer games), more common characteristics with other games of the same sport (e.g., common words and phrases, such as "batter" and "strike three" for baseball games), and an even greater number of common characteristics with other games of the same sport involving the same teams (e.g., presence and frequency of player names, team names, city, field name). Likewise, language-level metrics for each content category (e.g., sports, drama, comedy), sub-category (e.g., baseball, medical emergency drama, and stand-up comedy), and related subcategory (e.g., baseball games of a certain team, or episodes of the same television series) may be combined to generate respective signatures for each category, sub-category, and related sub-category, as explained further below.

A signature may include a value for each of any number of characteristics of content, from 1 to 5, 10, 20, 100, 1,000, 10,000, or more characteristics. Characteristics of content may include words, phrases, complexity level, reading level, profanity, caption metadata signals, speaker changes, and any other indicator of information about the content. Each characteristic may have a certain value for content, e.g., where 0 may indicate a lack of the characteristic and 1 may indicate a presence of the characteristic. The value may also be any number greater than or less than 1, such as 10 or 8.3 (e.g., number of words per sentence), 0.2 or 0.015736 (e.g., presence of proper nouns per sentence), 120 or 46 (e.g., number of speaker changes for the entire content), or any other number. Some, none, or all of the values may be on any one or more of a per-word, per-sentence, per-time duration (e.g., 10 seconds, 30 seconds, 1 minute, 5 minutes, etc.), or per-entire content basis. A signature may be stored in the form of a table, a listing of pairs of characteristics and corresponding values (e.g., reading level=1, profanity=0, words per sentence average=5.214, etc.), or any other form of data storage. As an example, content of a certain medical drama could include the word "doctor" or some medical term from a predetermined list of medical terms an average of 0.351 times per sentence, an exclamation indicator (e.g., "!") an average of 0.14218 times per sentence, an alarm or ambulance siren (e.g., "alarm," "siren," "[ambulance]") an average of 0.06583 times per sentence, and so forth. Ultimately, similarly content will tend to have similar signatures.

Content may be analyzed and result in the generation of a signature having values for certain characteristics within a particular range (e.g., 90% of its characteristics within +/−20%, 85% of its characteristics within +/−15%, 80% of its characteristics within +/−10%, etc.) of another signature, it may be readily identified within a category, sub-category, or related sub-category of content having similar signatures. Even if content is initially incorrectly identified (e.g., in an electronic program guide, or in closed caption data), or is not otherwise identifiable (e.g., live streaming content), by comparing its signature with signatures of other content, the content may be accurately identified, e.g., because a signature resulting from language-level metrics for errors in caption data may be relatively similar to the signature of the same caption data without errors. For example, a baseball game that is incorrectly categorized as a soccer game, may have a signature with a high rate of frequency of common baseball words (e.g., "strike," "out," "inning," "catcher," "base," or "batter," with frequencies such as 0.25 per sentence, 2.7 per minute, or 514.189 per entire content) and a relatively low rate of common soccer words (e.g., "goaltender," "yellow card," or "kick," with frequencies such as 0.00001 per sentence, 0.00 per minute, or 0.001 per entire content), whereas signatures of soccer games may have comparatively much lower frequency of common baseball terms and higher frequency of common soccer terms. By comparing a signature of such an incorrectly categorized baseball game with signatures of other content, including baseball games and soccer games, it may become evident that the content should be re-categorized from a soccer game to a baseball game. Alternatively, without knowing the original categorization of the content (e.g., such as with live streaming content), by comparing a signature of the content with other signatures, it may be grouped into the most closely similar signature, which is likely to be a baseball game in view of the language-level similarities of the content among baseball games. As shown by the above examples, by using signatures generated from language-level metrics, the impact of errors such as characters being dropped or other glitches in caption data may be minimized. If a larger number of characteristics are included in a signature (e.g., more than 5, 10, 100, 1,000, or 10,000), much larger errors may be accommodated as well, such as insertion of portions of caption data corresponding to content that is different from the content that is displayed or selected, or the insertion of an advertisement that is unrelated to the content. By using language-level metrics, errors may be factored out or minimized to provide a signature resembling that of error free caption data of corresponding content.

In addition or in the alternative to using signatures to correct data associated with content, signatures may also be used to identify collections of different content having similarities with each other. For example, the language-level metrics described herein may be used to determine a similarity score between various collections of content, such as content of different content listings or content assets. A user's viewing metrics (e.g., a combination of language-level metrics of content viewed by the user, displayed by a particular device, or both) may be compared with language-level metrics of other content (e.g., content metrics) to identify additional content that is likely to be of interest to the user. Language-level metrics may be combined for entire content listings or content assets to create a content signature, such as described above, or to create an entirely new genre of similar content. If a user has viewed multiple episodes of a content listing or content asset, a signature for that content (e.g., comprising an average or other combination of language-level metrics of each episode of that content listing or content asset) may be compared with signatures of other content. If a collection of content is identified having a signature similar to a signature for the viewed content (e.g., 90% of its characteristics within +/−20%, 85% of its characteristics within +/−15%, 80% of its characteristics within +/−10%, etc.), a content recommendation to the user may include some or all of that collection of content.

A content signature may cluster episodes of a particular content based on the language-level metrics. A signature for a particular content may include language-level metrics that indicate the same (or similar within thresholds) reading level, average sentence length, and frequency of speaker change. Additional metrics may also be applied to the content signature to further narrow the cluster, and fewer metrics may be applied to broaden it. Using signatures, data associated with content having a particular signature may be further associated with other content having the same signature (or similar signature within thresholds). This association of data with content having the same or similar signature may occur regardless of the number of times, or the channel via which, content is broadcasted. If a signature is identified for a particular content item, then language-level metrics and any other data associated with that signature may be further associated with that content item, irrespective of advertisements or errors that may be present in caption data associated with the content item. This clustering also may be performed based exclusively on the language-level metrics, e.g., without access to other information such as show titles and genre. By clustering episodes based on language-level metrics, content items may be clustered correctly even if they contain incorrect titles or if they are classified by genre incorrectly. By using a similarity score, content-based recommendations may be provided that are based on language-level similarities between various content items.

Users or categories of content devices and/or display devices may be grouped together based on viewing metrics associated with a user, a particular content device and/or display device, or both a particular device and a particular user. For example, users may be categorized by certain demographic information, including information that may be accessed from sources other than from content or caption analysis, such as from user-provided information or third party or other external sources (e.g., from one or more servers 105-107). Viewing metrics may be associated with a single user, a group of users using the same device (e.g., a set-top box 113), a user premise 102a (e.g., household, office, building, complex, etc.), a device 200, a category of device (e.g., smartphones, laptops, televisions, etc.), a region, or any other grouping. A viewing metric may also include a combination of these categories, such as user John Doe on a tablet computer in the Smith home between 6 pm and 9 pm, Jane Doe on a smartphone located in the subway on a weekday, or any other combination of user, device, location, time, day, or other category. Also, a user may have a plurality of viewing metrics such that the user may have different viewing metrics for one or more of different devices, locations, days of the week, time periods, and/or other category. For example, a user may view on a smartphone short-form content with lower linguistic sophistication (e.g., VOD sitcoms or sports news content items) when commuting on a train to and from work. The same user may view content on a high definition television with higher sophistication and other characteristics (e.g., movies or documentaries) when at home in the evening. Similarly, a device may have a plurality of viewing metrics such that the device may have different viewing metrics for one or more of different users, locations, days of the week, time periods, and/or other category. Each of the above categories (e.g., user, device, category of device, location, days of the week, and time periods) likewise may have a plurality of viewing metrics. For example, sub-categories of audiences and various combinations of categories may be created, such as adults located in a major city who prefer news content items, teens located in rural areas that watch sports, smartphones located in urban areas (e.g., for which reduced image quality may be an acceptable tradeoff for reduced latency of transmission and display), televisions or other display devices having screen sizes of forty inches or above (e.g., for some latency of transmission and display may be an acceptable tradeoff for increased of maximum image quality of high definition video), and any other categorization of characteristics. As a user, group of users, device, or category of device selects, views, or displays additional content, their associated viewing metrics (e.g., combination of the language-level metrics of content selected, viewed, or displayed) may be updated to provide continually improved content recommendations specific to a user, group of users, device, category of device, region, or other grouping.

Figure 2:
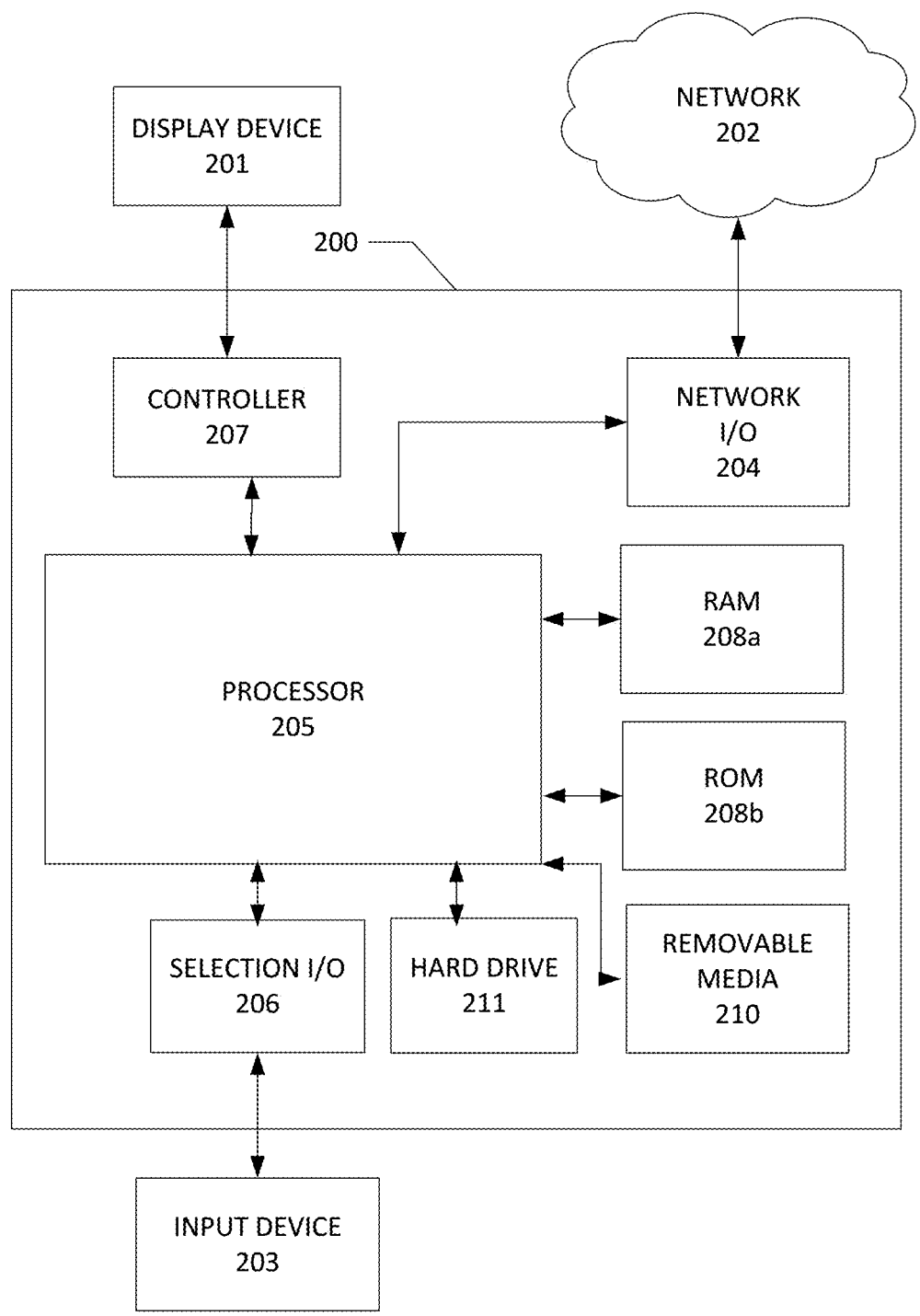
FIG. 2 is a block diagram showing an example device that may be used to receive or provide content recommendations.

FIG. 2 shows a block diagram of a device 200. The device 200 may comprise a set-top box or any computing device configured to receive content from a network 202 (e.g., a central office 103 or an external network 109 via the lines 101 in FIG. 1) for display on a display device 201, such as a television, computer, monitor, smartphone, or display screen of the device 200. The network 202 may include any device in the user premise 102a, on the lines 101, at a central office 103, and/or in an external network 109 shown in FIG. 1. The input device 203 may include a remote control configured to control one or more of a set-top box, a television, or other device (e.g., at or near a user premise 102a). The processor 205 receives commands that may include a control stream from the input device 203, via a content selection input/output 206, to select content received from the network 202, via a network input/output 204. The input device 203 may be used to provide any wired or wireless form of communications by a user to control the device 200. For example, the input 203 may include a remote control, voice command, keypad, or wired or wireless connection to another control device (e.g., remote control, set-top box, DVR, laptop, desktop computer, tablet, or smartphone). The processor 205 commands a device controller 207 to direct the display of the content on the display device 201. The processor 205 may perform the analysis of caption data of content selected or viewed by a user to create and update metrics. Metrics may be stored in memory, which may comprise any type of memory, such as one or more of a RAM 208a, a ROM 208b, a removable media 210, or a hard drive 211. This memory may also store and provide instructions to a processor 205 for operations described herein and/or store content for analysis by the processor 205, or display by a display device 201.

The device 200 may include any content device or display device described above regarding FIG. 1, or any combination thereof. The input device 203 may include an input from a source external to the device 200 (e.g., a remote control), internal to the device 200 (e.g., a keyboard for a computer), or both (e.g., a user interface on a smartphone that may display content or control a television or monitor to display content). The input device 203 may also include any type of input control, such as one or more remote controls (e.g., infrared, Bluetooth, motion sensor-enabled, voice-controlled), user-selectable switches (e.g., buttons on a set-top box), USB or other ports, connections to other devices, or any other input control. The device 200 may include a display 201, may be coupled to an external display 201, or both. For example, the device 200 may include a mobile phone having a display, a set-top box coupled to a television having a display, or a laptop both having a display and configured to couple to an external monitor or television having a display. One or more portions of the device 200, including any of the elements labeled as 201 and 203-211, may be included at one or more locations (e.g., at a central office 103, an external network 109, or a premise 102) or in one or more devices (e.g., the servers 105-107 and the devices labeled as 110-117).

The processor 205 may provide output data to an external network 202. The processor 205 may perform processes for determining decisions relating to content, such as decisions regarding advertising and recommendations, as well as any other data relevant to a user or content. Output data from a processor 205 may be provided to an external network 202 via a network input/output 204.

Figure 3:
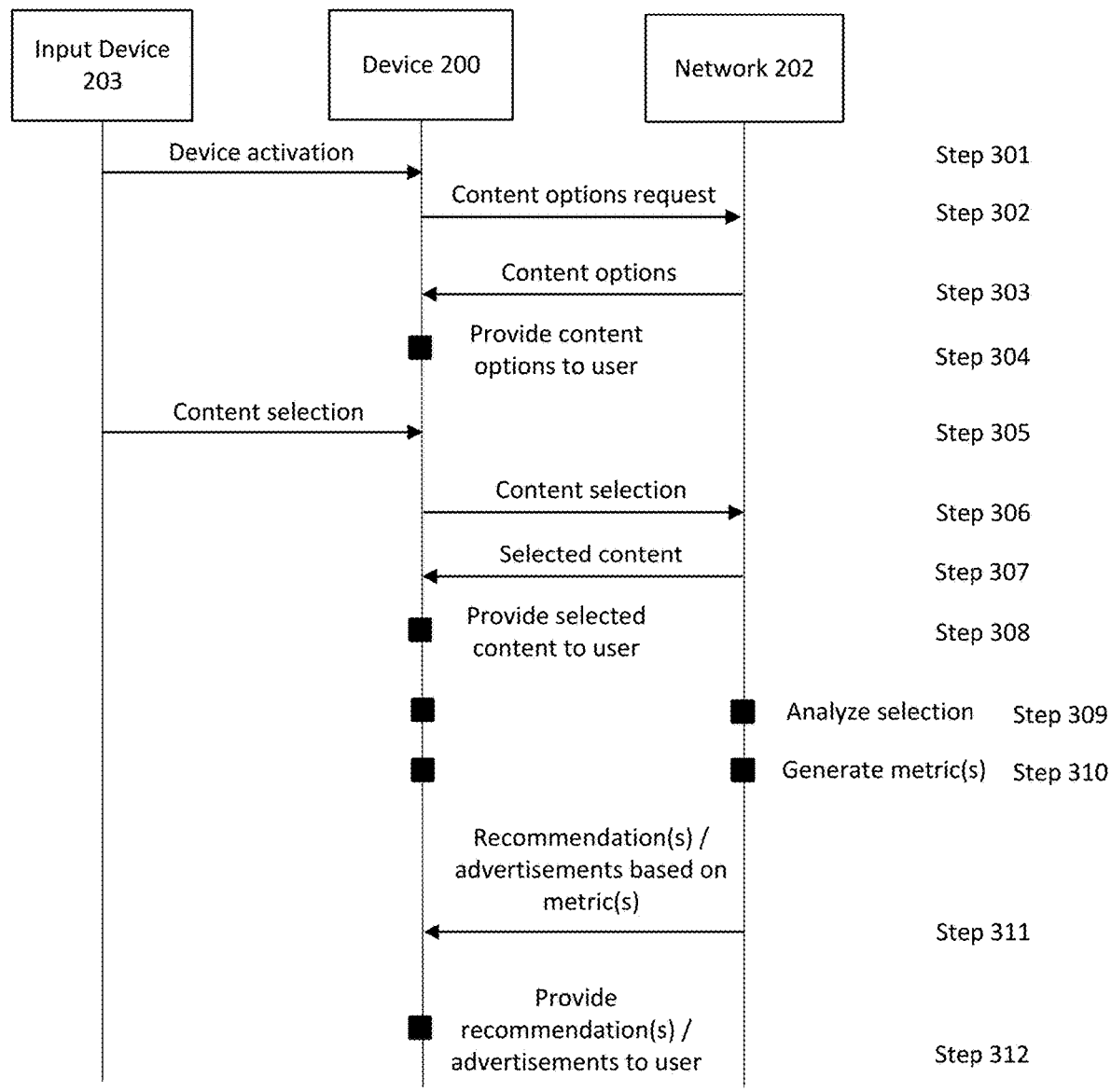
FIG. 3 is a diagram summarizing example processes for a content recommendation system using metrics.

FIG. 3 shows examples of communications between the input device 203, the device 200, and the network 202 for a content recommendation system using metrics. Using the input device 203 (e.g., a remote control) or another mechanism such as an on/off switch on the device 200, a user may activate the device 200, at step 301. The device 200 may request content options from the network 202 (e.g., via the network input/output 204), at step 302. Additionally or alternatively, content options may be accessed from any other device external from the device 200 or within the device 200, e.g., via one or more of a RAM 208a, a ROM 208b, a removable media 210, or a hard drive 211. Content options may include an electronic programming guide, still images of a video streams, a Video On-Demand ("VOD") menu, a listing of locally stored videos, or any other indication of content that may be available for a user.

Device activation and content options request in steps 301 and 302, respectively, may include a user log in, prior to the device 200 providing content options to a user. For example, to activate device 200, a user may be required to enter log in information (e.g., username and password, PIN, device code, account number, etc.) via the input device 203 at step 301. This log in information may be transmitted by the device 200 to a network 202, along with the content options request, at step 302. Prior to communicating content options to the device 200, a device in the network 202 may determine whether the log in information is correct information for a user, such as by confirming the information with user account information data. If the provided log-in information is verified to be correct, at step 303, content options may be communicated from the network 202 to the device 200 along with information about the user (e.g., confirmation of correct log in, identification of content categories authorized for access by the user, age restriction information associated with the user, etc.). As part of the user log in process, the device 200 may identify information about the user. Based on the log in information provided by the user at step 401, depending on whether users are teens, adults, children, people of various ethnicities, or people associated with other identifiable categories, the advertising and recommendations may be tailored based on the clustering results of processing of the caption data associated with content.

At step 303, the device 200 may receive content options from network 202. The device 200 may provide the content options to a user at step 304. The device 200 may provide the content options to a user by displaying indications of the content options on a display device 201 or on an input device 203 (e.g., a display on a remote control, computer, or a smartphone), such as in a content menu (e.g., electronic program guide or other user interface). The device 200 may receive a content selection from the input device 203, at step 305, indicating a user's selection of particular content for viewing. These indications of content selection (e.g., step 305) may include an indication of a channel change, content menu selection, powering on or off of a television or other device, or any other action associated with changing or selecting content for display, or viewing content displayed, on a display device 201. For example, using the input device 203, a user may select or view various content, or select options in a menu on a display device 201, that may be collected by the processor 205 in the device 200 (e.g., at step 305). The device 200 may communicate the content selection to a network 202, at step 306. Selected content may be received by the device 200 from the network 202, at step 307. Selected content may be provided to the user by the device 200, at step 308, such as by including the selected content in output data for display on the display device 201. At steps 309 and 310, selected content may be analyzed and metrics may be generated, respectively. Analysis of content and generation of metrics is described further below, and may be performed in whole or in part by any combination of devices in the network 202. Additionally or alternatively, analysis of content and/or generation of metrics may be performed in whole or in part by the device 200.

Output data indicating content that is selected by a user (e.g., at step 306), or displayed by a display device 201 (e.g., at step 308), may be communicated to a network 202. One or more indications of a user's selection of content, or portion of content, for viewing on a display device 201 also may be transmitted to a network 202, e.g., via a network input/output 204, and received by a central office 103 (e.g., at any of the servers 105, 106, and/or 107). Output data may be linked to upstream databases in the external network 202 (e.g., servers 105, 106, and/or 107 in a central office 103), and may include data specific to a user, group of users, or premise. Output data may include data that is aggregated and anonymized, e.g., to maintain user privacy. For example, output data from multiple users may be collected at a central office 103 (e.g., at any of the servers 105, 106, and/or 107), and used to determine content recommendations for those users, a subset of those users, or other group of users.

Information such as an identification of content viewed, as well as the time and day of viewing, may be input (e.g., via a content selection input/output 206) into the processor 205, which may perform processes such as determining advertising and recommendations, for further distribution and recommendation of content. In response to receiving an indication of a content selection via a content selection input/output 206, the processor 205 may obtain additional information about the content, and the processor 205 may store the additional information and any other information about the content selection (e.g., time of selection, date of selection, identification of user) in memory, e.g., one or more of a RAM 208a, a ROM 208b, a removable media 210, or a hard drive 211, or transmit it to a network 202. Metrics, including language-level metrics associated with content and viewing metrics associated with users, may be applied as one of a plurality of types of inputs to the processor 205 from memory (e.g., one or more of a RAM 208a, a ROM 208b, a removable media 210, or a hard drive 211) or a network 202 (e.g., via a network input/output 204), which may further include a variety of metadata. Processes described herein may be performed in the external network 202 and/or within the device 200, such as in the processor 205, a RAM 208a, a ROM 208b, a removable media 210, a hard drive 211, or a combination thereof.

Caption data associated with content may be processed in response to a request for an identification of content options (e.g., step 302), before or after communicating content options from the network 202 to the device 200 (e.g., step 303), in real-time or near real-time with providing content options to a user (e.g., step 304), in response to receiving a content selection from a user (e.g., step 305), in response to receiving a content selection from the device 200 (e.g., step 306), in real-time or near real-time with communicating selected content from the network 202 to the device 200 (e.g., step 307), in real-time or near real-time with providing selected content to a user (e.g., step 307), or after providing content to user (e.g., before, during, or after steps 309 and/or 310). Processing caption data in real-time or near real-time may be made less detailed than processing caption data in advance of providing content to a user, or after content is viewed by a user. For example, processing caption data in real-time or near real-time could include analyzing only a subset of content such as an initial portion (e.g., the first 15 seconds, 30 seconds, 1 minute, 2 minutes, 3 minutes, etc.) or skimmed portion (e.g., every other sentence, every fifth sentence, or first complete sentence at intervals of 1 minute, 2 minutes, 3 minutes, etc.). Processing caption data in advance of providing content to a user, or after content is viewed by a user, may be more robust (e.g., analyzing the entirety of the content or a minimum percentage of the content such as 10%, 20%, 30%, . . . 90%, etc.) because more time may be used for the analysis without potentially disrupting delivery and display of the content. Results from processing caption data prior to providing selected content to a user (e.g., step 308) may be included, e.g., as metadata into a content guide such as an on-screen menu.

Advertising and recommendation processes may be used to provide language-level content recommendations, including advertisements, at step 311 (e.g., from the network 202 to the device 200). The recommendations and/or advertisements may be provided to a user, at step 312, such as by displaying them on a display associated with device 200. As an example, if a user is watching content having associated metrics indicative of a certain sophistication level of content (e.g., quantifiable as 8 to 10 on a scale of 1-10, or 80 to 100 on a scale of 1-100), the processor 205 may determine advertising for that user that is similarly sophisticated, such as for financial services or luxury items. However, if another user is watching content having associated metrics indicative of a lower sophisticated level of content (e.g., quantifiable as 1-3 on a scale of 1-10, or 1 to 30 on a scale of 1-100), then advertising may be selected by the processor 205 that is a similarly low sophistication level, such as low cost consumer goods. Sophistication level may include a combination of characteristics, such as reading level, complexity level (described above), or financial data (e.g., frequency of words such as "dollars," "investment," "stock," "funds," etc., or symbol such as "$" or "%"). As one example, content including an average of 0.25 or more financial data terms per sentence may have a sophistication level of 5 to 10, on a scale of 1-10, whereas content having an average of less than 0.15 financial data terms per sentence may have a sophistication level of 1-3 on a scale of 1-10. Other characteristics, such as average length of sentences, may further narrow the above ranges. For example, an average length of 25 or more words with an average of 0.25 or more financial data terms per sentence may correspond to a sophistication level of 10 on a scale of 1-10, whereas an average length of 10 or fewer words with an average of 0.25 or more financial data terms per sentence may correspond to a sophistication level of 8 on a scale of 1-10. Any number of characteristics and numerical ranges may be used to determine a sophistication level of content. Table 1 below provides an example for determining a sophistication level of content that may be used to identify appropriate advertisements for a user based on, e.g., a reading level of content and financial data included in the content.

TABLE 1

| Sophistication Level | Reading Level: | | | | |
|---|---|---|---|---|---|
| Financial data per sentence: | 5 | 4 | 3 | 2 | 1 |
| >0.50 | 10 | 9 | 8 | 6 | 5 |
| 0.35-0.50 | 9 | 8 | 7 | 5 | 4 |
| 0.20-0.34 | 8 | 7 | 6 | 4 | 3 |

TABLE 1-continued

| Sophistication Level | Reading Level: | | | | |
|---|---|---|---|---|---|
| Financial data per sentence: | 5 | 4 | 3 | 2 | 1 |
| 0.05-0.19 | 6 | 5 | 4 | 3 | 2 |
| <0.05 | 5 | 4 | 3 | 2 | 1 |

In the example of Table 1 above, reading level is on a scale of 1 (lowest) to 5 (highest), and financial data per sentence is grouped into five categories, e.g., greater than 0.50, 0.35 to 0.50, 0.20 to 0.34, 0.05 to 0.19, and less than 0.05. By pairing a reading level of the content with the financial data per sentence value for the content, a sophistication level of the content may be determined. For example, if content has a reading level of 4, and financial data per sentence of 0.27 (e.g., 0.034 to 0.20), then a corresponding sophistication level would be 7 (from Table 1 above). As another example, if content has a reading level of 2 and financial data per sentence of 0.01 (e.g., less than 0.05), then a corresponding sophistication level would be 2 (from Table 1 above). Table 1 may be expanded to include more reading levels (e.g., on a scale of 1 to 10, 1 to 20, or 1 to 100), a larger or smaller scale of sophistication level (e.g., 1 to 3, 1 to 20, or 1 to 100), or a larger or smaller interval of financial data per sentence (e.g., 0.001, 0.010, 0.10, 0.20, 0.30, or 0.50). Table 1 may be modified to include different or additional characteristics (e.g., average words per sentence or average letters per word). As an example, Table 1 could correspond to an average sentence length of 8 to 10 words, a second table with higher sophistication values per each entry could correspond to an average sentence length of greater than 10 words, and a third table with lower sophistication values per each entry could correspond to an average sentence length of less than 8 words. In this way, tables as described above may be used to form a matrix that may be used to determine a sophistication level of content based on any number of characteristics. Similarly, tables and/or matrices such as described above may be used to determine sophistication levels of advertisements. Content having a particular sophistication level may be associated with advertisements having the same or similar sophistication level (e.g., within a range of 1, 2, or 3 levels), and those advertisements may be included within, before, or after the content.

In addition or in the alternative to analyzing content (e.g., at step 309) and generating metric(s) (e.g., at step 310) based on the analysis of the content, metrics may be based on a language-level analysis of web pages or other text, images, or video data viewed by a user or accessed by a device. For example, a user could select content, such as a VOD program, from a computer, smartphone, or other device (e.g., the device 200). Alternatively or additionally, the user could access a web page containing text, image, and/or video data. Either or both of the VOD program and web page data may be analyzed (e.g., at step 309) using language-level analysis described herein. Further, either or both of the language-level analysis of VOD program and web page data may be used to generate metric(s) (e.g., at step 310). Based on such metric(s), recommendations for other content, other web pages, and/or advertisements may be provided (e.g., at steps 311-312) to a device 200 and/or a user of the device 200. Metrics may be combined with other advertising data to provide an improved advertising system that is based at least on a language-level analysis of text, image, and/or video at a web page accessed by a device and/or viewed by a user.

Similarly, the time of day and location of the user may also be factored in determining advertising for a user. For example, content selection in step 305 in FIG. 3 may include the time of day identified by processor 205 for the content selection (e.g., via contention selection input/output 206). Content selection in step 306 may include storing the time of day in local memory (e.g., one or more of a RAM 208a, a ROM 208b, a removable media 210, or a hard drive 211), or communicating it to the network 202 (e.g., for storage in any of the servers 105, 106, or 107), along with an indication of the content viewed and an indication of the location of viewing (e.g., identification of a user, device, or local network associated with the content selection). Communications may include requests to any of the servers 105, 106, or 107 at the central office 103, or any device in an external network 109, for user data to associate with a content selection.

Figure 4:
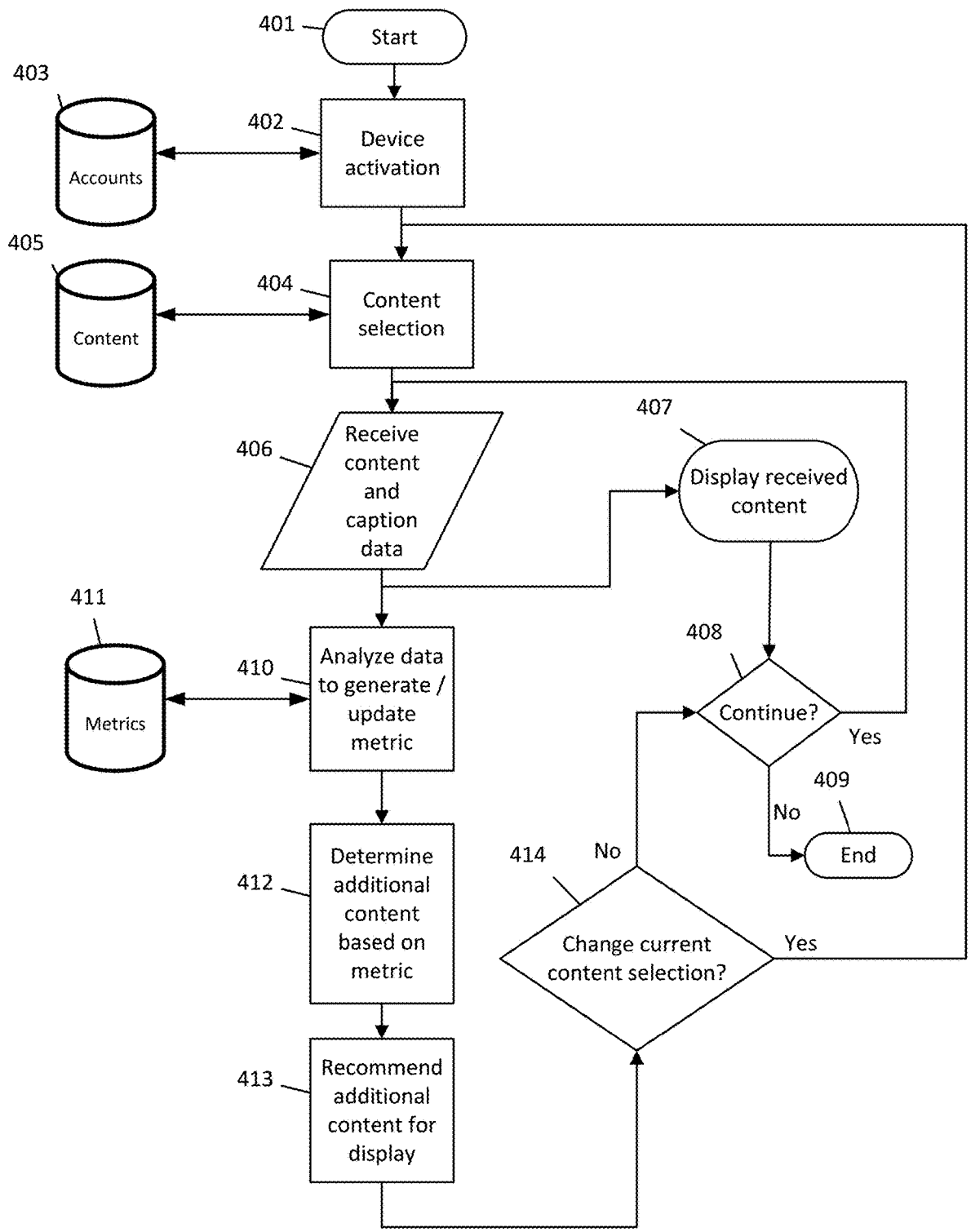
FIG. 4 is a flowchart summarizing processes for an example content recommendation system using closed captions that may be implemented in connection with a content delivery system.

Communications described above with respect to FIG. 3 may be performed with the processes in FIG. 4, which is a flowchart providing additional details for language-level content recommendations. The processes described with respect to FIG. 4 may be implemented by an input device 203, the device 200, and/or a device in network 202 described above regarding FIG. 2, in addition to or in the alternative to steps described above regarding FIG. 3. At step 401, a process for language-level content recommendations may begin. If a user wants to view a content item, such as a television program, VOD program, or streaming video, the user may turn on a device to begin device activation, at step 402. This step 402 may include the device activation described above regarding step 301, incorporated by reference here. For example, a user may control an input device 203 (such as a remote control or smartphone) to activate a device 200 (such as a set-top box or DVR) for accessing content. A user may manually power on the device 200 using a power switch on the device 200, or a user may control the input device 203 to communicate a signal to turn on the device 200. The device 200 may be powered on and may request a user to enter log in information (e.g., username and password, PIN, or account information), e.g., via a display device 201 or the input device 203. The device 200 may communicate with an accounts database 403 (e.g., at a central office 103) or other storage of account related information to verify the log in information entered by the user. If it is verified that the user has access to content, and additionally or alternatively if an access level of content is verified (e.g., whether the user is a subscriber to premium content, or whether the user is limited to certain age-restricted content), content selection may begin at step 404.

Content selection 404 may include the content selection described above regarding steps 302-306 of FIG. 3, incorporated by reference here. For example, as in steps 302 and 303, the device 200 may send a content options request to a content source 405, and receive from the content source 405 options of content available to the user (e.g., electronic programming guide information, VOD menu, or menu for streaming video). As in step 304, the options of content available to the user may be provided to the user via a display 201 or the input device 203. The user may then select content (e.g., via the input device 203) by communicating a signal for content selection to the device 200, which may then communicate a signal for content selection to the content source (e.g., via a network 202). In response, at step 406, the device 200 may receive the selected content and associated caption data from the content source, as in step 307.

At step 407, received content that was selected by the user may be displayed on a display device 201, such as on the user's television, smartphone, computer, etc. Display of received content 407 may include the above description regarding step 308, incorporated by reference here. Display of the received content may continue, at step 408, until a user requests to discontinue the content display (e.g., changes a channel, or stops or pauses a VOD program) or the device 200 powers off or enters a sleep mode, such as after a predetermined period of inactivity from the user (e.g., via a lack of communications received at a selection input/output 206), at step 409.

Figure 5:
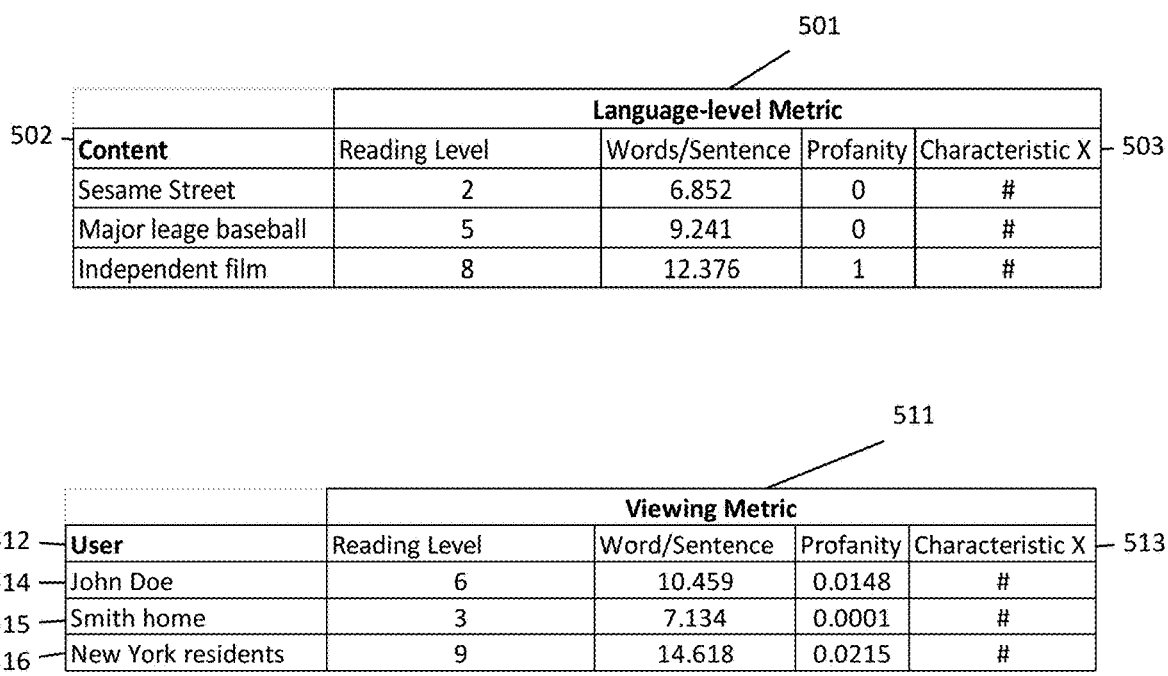
FIG. 5 shows examples of language-level metrics and viewing metrics for a content recommendation system using closed captions that may be implemented in connection with a content delivery system.

At step 410, received content, caption data of closed captions associated with the selected content, or other data may be analyzed to generate or update one or more metrics, such as shown in FIG. 5, described below. Analysis of data may be performed either after or prior to a device receiving the data at step 406, or either after or prior to display of received content at step 407. Content and caption data may be analyzed to generate or update language-level metrics stored in a metrics source 411 (which may comprise viewing metrics if content is selected or viewed by a user, described further below with respect to FIG. 5)

If a content item such as streaming video program has not been analyzed before, a new language-level metric may be created for the content and stored in a metric source 411. If, however, content such as a VOD program has already been analyzed to generate a language-level metric prior to a user receiving the content, the metric source 411 may provide the language-level metric to a device (e.g., the device 200) at step 410 and associate that language-level metric with a user that requested the content (e.g., at step 404) or viewed the content (e.g., at step 407, such as if content is automatically displayed as a preview and the user does not discontinue viewing the content by selecting other content or turning off the device 200). For content already having a language-level metric in the metric source 411 by the time it is received (e.g., at step 406), the metric may be updated based on any new information obtained from analysis of content and caption data at step 410. As an example, a viewing metric (described further below with respect to FIG. 5) may be associated with a user, stored in the metric source 411, and updated to include the language-level metric of each content item (e.g., television program, VOD program, streaming video, etc.) requested by a user. A viewing metric may include a combination and/or average of all language-level metrics of content requested or viewed by a user. The language-level metrics and viewing metrics may be stored in a metric source 411 located at any location, including at a device at the lines 101, central office 103, external network 109, or user premise 102*a*. Also, language-level metrics and viewing metrics may be transmitted to or received from any location, including at a device at the lines 101, a central office 103, an external network 109, or a user premise 102*a*. Content may be displayed (e.g., step 407) and analyzed (e.g., step 410) simultaneously, at substantially the same time, or at different times.

At step 412, additional content may be determined based on one or more metrics. Language-level metrics for content requested or viewed by each user, user premise, or group of users may be combined in a viewing metric. The viewing metric may be indicative of a user's content preferences. For example, if a user's viewing metric has a zero or near-zero profanity level, it could indicate that the user likely prefers content without profanity. As another example, if a user's viewing metric has a high reading level average (e.g., 8 to 10 on a scale of 1-10) and a high number of words per sentence average (e.g., more than 12, 14, 15, etc.), then the user is likely to prefer content having a similarly high reading level average and high number of words per sentence.

At step 412, a user's preferences are taken into account by comparing the user's viewing metrics with language-level metrics of content available to the user (e.g., corresponding to content options provided at step 304). For example, while a user may have content available that has language-level metrics indicating profanity and a reading level that is not high (e.g., 7 or below, on a scale of 1 to 10), such content may be removed from consideration in step 412 based on it failing to match with the user's viewing metric.

The comparison of language-level metrics of content available to a user and viewing metrics for the user may include a combination of various thresholds and weights. For example, profanity could be weighted higher than reading level (e.g., 2, 5, or 10 times greater than reading level), such that determining additional content in step 412 may exclude all content having profanity unless a user's viewing metric has a reading level within +/−10% of the reading level of a particular content available to the user, and exclude content having no profanity if it's language-level metric indicates a reading level more than +/−30% of the reading level of the user's viewing metric. As another example, the average words per sentence could be weighted lower (e.g., wider range of variance) than the reading level, but higher than an average profanity word per sentence. In this example, available content may be identified that is within certain values of a user's viewing metric, such as content having a language-level metric that is +/−30% of average profanity words per sentence of a user's viewing metric, +/−20% of average words per sentence of the user's viewing metric, and +/−10% of a reading level of the user's viewing metric. Any type of weighting system may be used in step 412 to emphasize or deemphasize certain language-level characteristics, such as any +/−% tolerances for each language-level characteristic. Additionally or alternatively, the user may be provided with samples of content (e.g., 30 second video clips, textual summaries, titles, etc.) that the user may designate as representative of the user's interests (e.g., via selections using the input device 203, such as a remote control, computer, or smartphone). Representative designations may be made for device activation (e.g., step 402), or content selection (e.g., step 404), or for any other process. At step 410, the language-level metrics for the content designated as representative of the user's interests may then be combined (e.g., averaged or weighted-averaged based on a level of interest identified by the user such as from 1 to 10) to generate a user's viewing metric or to be combined with an existing user's viewing metric (e.g., averaged or weighted-averaged such as accounting for 10% or 25% of the content factored into the user's viewing metric). Step 412 may be performed at any device, including at a device at the lines 101, a central office 103 (e.g., any of the servers 105, 106, or 107), an external network 109, or a user premise 102*a* (e.g., the devices 110-117).

After additional content is determined from step 412, some or all of the additional content may be recommended to a user at step 413. Recommended content may be provided to the user in the same manner described above regarding steps 303 and 304. For example, a device in the network 202 may send an indication of recommended content to a device 200, such as a user's set-top box, which may then display an indication of the recommended content to the user, such as on the user's television. The indication of recommended content could take many different forms. For example, the indication could be a title of the recommended content, a video sample of the recommended content, a description of the recommended content, or an indication of the closeness of the recommended content with the user's interests (e.g., a number such as "99%" matching the user's viewing metric, or 5 stars on a scale of 1-5 stars that could be indicative of matching the user's viewing metric within +/−20%). The indication of recommended content may appear on the user's display 201, for example, before, during, after, at the conclusion of a user viewing content (e.g., at the end of a television program with an invitation such as "Would you like to see another show like this one?"), or at any other time, along with the content options provided at step 304 with an indication of which content is recommended content (e.g., a star or highlighted text for recommended content), or at any other time.

Additionally, at step 413, advertisements may also be provided based on a user's viewing metric. For example, for a user with a viewing metric indicating a high preference for college sports (e.g., based on having an above average value for sports related words per sentence of content, such as "goal", "score", "points", "player", "ball", etc.; in combination with an above average value for college or university related words or phrases per sentence such as "college", "university", "sophomore", "red shirt", "student athlete", etc.), advertisements may include a higher rate of advertisements for college sports content (or college sports related goods and services) than advertisements displayed to other users, even if the VOD program the user is currently viewing does not relate college sports (e.g., the VOD program could be a documentary, sitcom, or drama). As an example, a device in a network 100 may transmit to the device 200 (e.g., in step 307) advertisements regarding a wide range of subjects. These advertisements may be stored at the device 200 (e.g., in one or more of a RAM 208a, a ROM 208b, a removable media 210, or a hard drive 211), and if a user logs in or is otherwise identified (e.g., via step 301), the viewing metrics (e.g., in a metrics source 411) may be compared with language-level metrics of the advertisements. If an advertisement is to be displayed (e.g., at the conclusion of a VOD program), an advertisement may be selected for display that has a language-level metric that is within a range of or numerically closest to the user's viewing metric. Additionally or alternatively, advertisements regarding a wide range of subject may remain stored at a device in the network 202, and a user's viewing metric (e.g., in a metrics source 411) may be compared with language-level metrics of the advertisements at a device in the network 202. Then, an advertisement may be selected, by a device in the network 202 for display on a display device 201, that has a language-level metric that is within a range of or numerically closest to the user's viewing metric.

At step 414, it may be determined whether one or more indications to change a current content selection or viewing occurs. For example, a user may change a television channel, stop or pause a program, or perform any other action that may change a display of content. If such an indication occurs (e.g., via a signal at a selection input/output 206), the process may repeat at step 404. If the above processes of FIG. 4 are repeated, the step for recommending additional content, step 413, may also be repeated or only repeated after a predetermined time (e.g., once per 15 minutes, at a commercial break of a television program, at the end of a program being viewed, or not until after a next device activation). If an indication to change a content selection for viewing does not occur, it may be determined whether the process should continue, at step 408. If it is determined that the process should continue, the process continues at step 406. As examples, if a duration of time has not yet been reached or a threshold amount of data relating to the content has not yet been determined, the process may continue until that duration and/or threshold has been reached. Otherwise, the process ends at step 409, such as described above. Received content may continue to be displayed at step 407 until it is determined, at step 408, that the process should end at step 409. Any one or more of steps 401-414 may be performed in whole or in part by one or more of a device at the lines 101, a central office 103, an external network 109, or a user premise 102a.

FIG. 5 provides examples of language-level metrics and viewing metrics. A language-level metric 501, or content metric, may include values associated with any number of language-level characteristics 503 of content 502 selected or viewed by a user. Language-level characteristics 503 may include any characteristic of the content 502 on a linguistic or language-level, such as an average reading level (e.g., on a scale of 1 to 5 or 1 to 10), average number of words per sentence (e.g., 14.3, 18.613, 7.4791), and presence or frequency of profanity (e.g., 0=none, 1=present; a count of occurrences per word, sentence, or across an entire content; or a time frame such as per 1 minute, 2 minutes, 5 minutes). In the example shown in FIG. 5, a language-level metric for an episode of "Sesame Street" could have a reading level of 2, an average of 6.852 words per sentence, a level of 0 profanity, and a value for any other characteristic of the content. Similarly, a language-level metric for a particular major league baseball game could have caption data corresponding to a reading level of 5, an average of 9.241 words per sentence, a level of 0 profanity, and a value for any other characteristic of the content. Finally, language-level metric for a particular independent film could have caption data corresponding to a reading level of 8, an average of 12.376 words per sentence, a level of 1 profanity, and a value for any other characteristic of the content.

If a user selects or views content, the language-level metric 501 for that content may be combined and averaged with other language-level metrics for content previously selected or viewed by that user to generate a viewing metric 511 for one or more of the user 512, the device 200, category of device, region, location, time, day, other category, or any combination thereof. As an example, the viewing metric 511 may be for a particular user 514 (e.g., "John Doe"), a user premise 515 (e.g., "Smith home"), or a user group 516 (e.g., "New York residents"). The language-level metrics 501 and the viewing metrics 511 may include any number of characteristics 503 and 513, respectively, of the content 502 viewed or selected by the users 512. In the example shown in FIG. 5, a viewing metric for a particular user 514 could have an average reading level of 6, an average words per sentence of 10.459, an average of 0.0148 instance of profanity per word or other fixed amount of content, and a value for any other characteristic of the content viewed by the user. Similarly, a viewing metric for a premise 515, that could include multiple users, could have an average reading level of 3, an average words per sentence of 7.134, an average of 0.0001 instance of profanity per word or other fixed amount of content, and a value for any other characteristic of the content collectively viewed by the users identified with the premise. Finally, a viewing metric for a particular group of users 516 could have an average reading level of 9, an average words per sentence of 14.618, an average of 0.0215 instance of profanity per word or other fixed amount of content, and a value for any other characteristic of the content collectively viewed by the group of users. Language-level metrics and viewing metrics may be included, e.g., as metadata, with stored content, or stored separate from content in any local memory (e.g., in one or more of a RAM 208a, a ROM 208b, a removable media 210, or a hard drive 211 in a device at a user premise 102a) or at another location such as at any device in the network 202 (e.g., a central office 103 or an external network 109). While not shown in FIG. 5, a viewing metric may also be determined for one or more of a device 200, category of device (e.g., smartphones, televisions with screens above forty inches, laptops, or tablets), type of screen on a device (e.g., plasma, LCD, LED, or OLED), region (e.g., suburbs, particular city, or East coast), location (e.g., subway, highrise building, or residential suburban area), transmission system (e.g., cable, satellite, or cellular), time (e.g., peak evening hours, off-peak overnight hours, or morning rush hour), day (e.g., weekdays, weekends, or Fridays), other category, or any combination thereof, whereby the tables for the viewing metrics 511 and/or the language-level metrics 501 in FIG. 5 may be expanded to include any such category or combination of categories.

Figure 6:
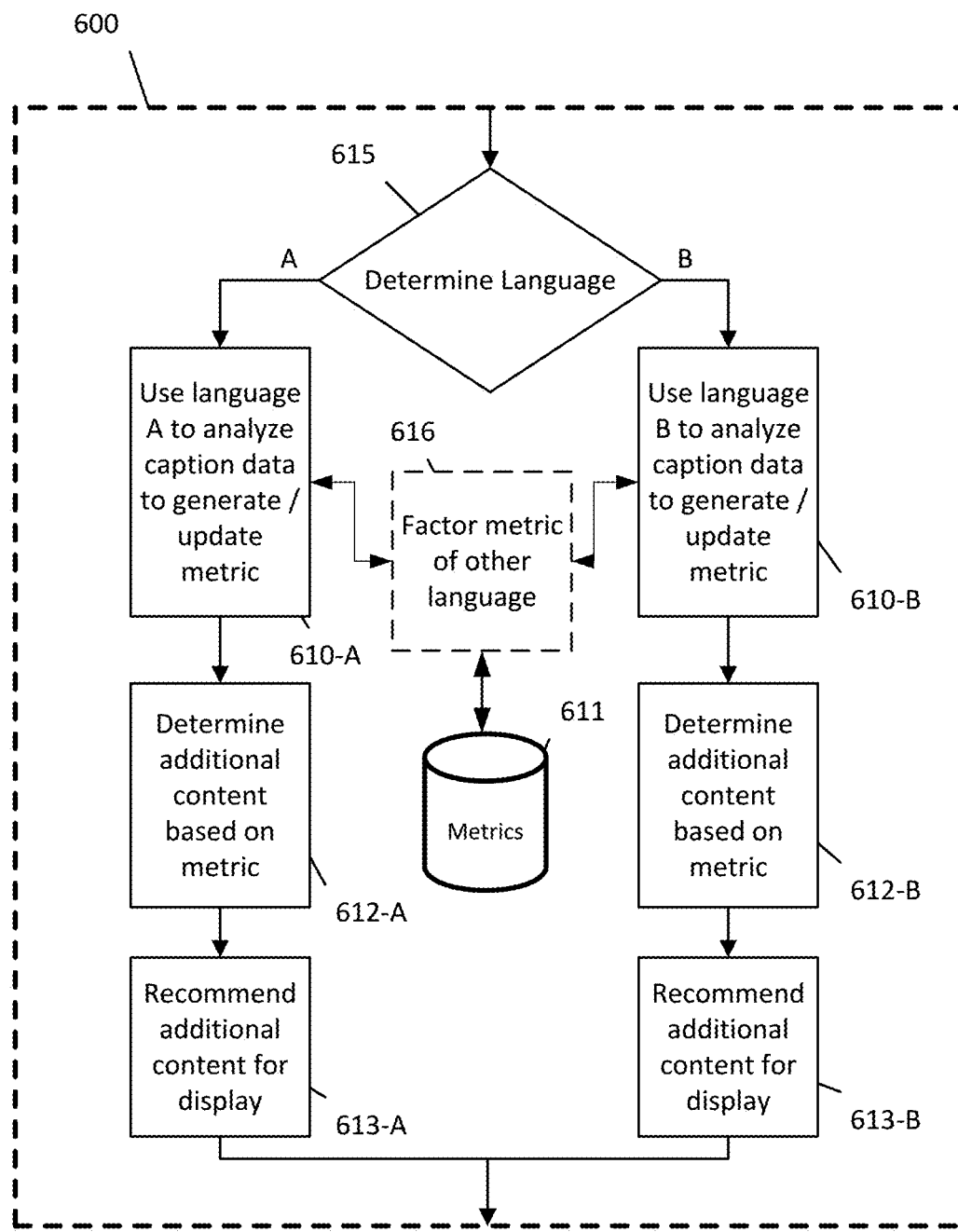
FIG. 6 is a flowchart summarizing example processes for a content recommendation system using metrics for different languages that may be implemented in connection with a content delivery system.

FIG. 6 is a flowchart summarizing example processes for language-level content recommendations that may be performed in addition or in the alternative to the processes described above regarding FIG. 4, whereby language-level metrics may be transposed across different languages. Except as noted below, steps 610-613 in FIG. 6 correspond to steps 410-413 in FIG. 4, respectively, and the corresponding description of these steps with respect to FIG. 4 also applies to FIG. 6 and is incorporated by reference here. For example, language-level metrics discussed above may be generated based on analysis of certain English-language content, and then applied to certain non-English language content (e.g., Spanish-language content) such that content recommendations may be for content of one language (e.g., Spanish) based on language-level metrics generated from caption data of another language (e.g., English). Such a feature could be useful for multi-lingual users, where content could be of interest in more than one language, and thus, caption data of one language could be useful for recommending content associated with caption data of another language. Processes shown in 600 may be performed after step 406 and prior to step 414 in FIG. 4.

In step 615, it may be determined whether received content is in a known language "A" or "B" (e.g., English or Spanish, respectively). For example, an indication of language of the content may be included in metadata of the content or caption data, or it may be determined using speech processing performed by a processor (e.g., processor 205, or a processor location at a network 202). This determination also may be performed for any number of any languages. Metrics 611 may include metrics in one language (e.g., English), wherein caption data associated with content that may include other languages may be translated from any other language to one language. However, it may be advantageous to generate and update metrics for more than one language. For example, sometimes multiple words in a non-English language may translate to the same English word, and vice versa, such that some context of a language may be lost in a translation. As another example, profanity words in one language may not be considered to be profanity in another language, or may not have an understandable translation in another language. Using metrics only in English, or only for caption data translated to English, may cause inaccuracies in this way that may be avoided by using metrics for multiple languages. Other examples for differences among languages that may be relevant to language-specific metrics include relevant words or phrases (e.g., cities, regions, public figures, sports teams, etc.) or different measures for reading level, age restrictions, and cultural differences. By using separate metrics for each language, context unique to each language may be preserved to provide more robust and accurate metrics that may be useful for multi-lingual users. In the same way that metrics may be included that are in different languages, metrics may also be included that are customized for different countries or regions (e.g., to address cultural differences, or differences in words or phrases of interest such as public figures, slang, local places, etc.), such that step 615 may be modified to determine a user's country, region, etc., and a metrics source 611 may include metrics that are specific to a categorical determination (e.g., corresponding to steps 610-613).

Returning to step 615, if content is determined to be in language A, then steps 610-A, 612-A, and 613-A are performed (corresponding to steps 410, 412, and 413 of FIG. 4, respectively, described above). In particular, language A is used to analyze the caption data to generate or update one or more language-level metrics, as shown in step 610-A, for content that is identified to be in language A. If content is determined to be in language B, then steps 610-B, 612-B, and 613-B are performed (corresponding to steps 410, 412, and 413, respectively, described above). In particular, language B is used to analyze the caption data to generate or update one or more language-level metrics, as shown in step 610-B, for content that is identified to be in language B.

Optionally, at step 616, one or more language-level metrics may be used to generate or update another language-level metric in a different language. For example, one or more language-level metrics in language B may be used to generate or update one or more language-level metrics in language A, and one or more language-level metrics in language A may be used to generate or update one or more language-level metrics in language B. For example, if most of a user's selected content is in language A, then it could be more efficient to maintain a single viewing metric for the user in language A, and update the user's viewing metric with language-level metrics for content selected in either language A or language B. In this example, when content is selected by the user that has caption data in language B, an initial or temporary metric in language B may be generated and then translated to a corresponding language-level metric in language A. The translated language-level metric in language A may then be combined (e.g., averaged or weighted-averaged such that it has, e.g., 10% or 25% of the weight of a native English language metric to account for possible inaccuracies in the translation) with the user's viewing metric in language A. As another example, if a user's selected content is relatively evenly divided among languages A and B, viewing metrics in both languages may be generated and updated, such that language A viewing metrics include language-level metrics from both language A and translations of language level metrics from language B. Likewise, language B viewing metrics may include language-level metrics from both language B and translations of language level metrics from language A. If a user that has viewing metrics in languages A and B selects content for viewing, the language of the selected content (e.g., A or B) may determine which viewing metrics (i.e., in language A or B, respectively) should be used for recommending additional content (in steps 613-A and 613-B). In this way, more accurate recommendations may be provided to a user that selects content with multiple languages.

The processor 205 described above with respect to FIG. 2 may be used at step 616 to transpose language-level metrics across the different languages (e.g., languages A and B), and it may also alter language-level metrics based on the language. For example, language-level metrics in some languages may emphasize certain language-level features over others. Thresholds or ranges may be established on a user-by-user, group-by-group, or premise-by-premise basis that determine to what degree, if any, language-level metrics of different languages impact viewing metrics. For example, if a user views content with language A 90% of the time and views content with language B 10% of the time, then viewing metrics for that user could be generated primarily from language-level metrics of language A, and impacted less by a language-level metric generated from language B content. In this example, the user's viewing metric could be weighted at 90% for language-level metrics of language A and weighted at 10% for language-level metrics of language B, such that a VOD program viewed in language A may have proportionally greater impact on the user's viewing metric than for a VOD program viewed in language B. The above example may also be extended to include a metric for a user premise or a group of users.

Figure 7:
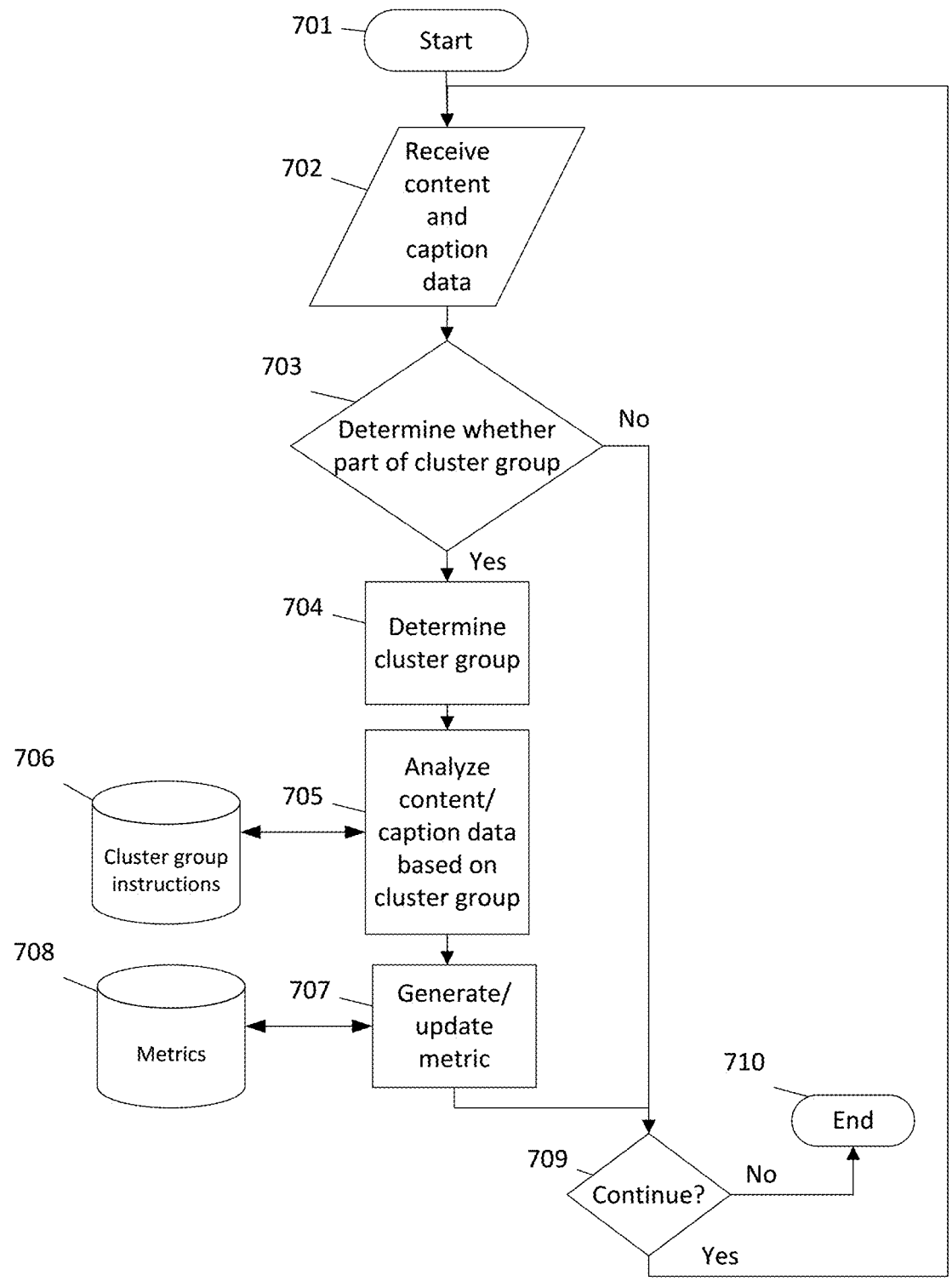
FIG. 7 is a flowchart summarizing example processes for a content recommendation system that may generate metrics based on cluster groups.

FIG. 7 shows example processes for determining metrics that may be used to provide content recommendations based on content that is identifiable as belonging to a group of similar content. More specifically, the processes depicted in FIG. 7 may be used to generate metrics in an efficient manner for received content and/or caption data that is part of a cluster group of similar content. The processor 205 described above regarding FIG. 2 may process caption data associated with received content into cluster groups, e.g., based on similar language patterns identified from language-level metrics. For example, a cluster group could include multiple episodes of a certain television series, where each episode in the group could be further processed to determine specific similarities or differences among episodes (e.g., presence or absence of characters, sequence order relative to other episodes, etc.). As other examples, a cluster group may include a genre of content (drama, comedy, action, child cartoons, sports, documentary, etc.), sub-group of a type of content such as a type of sports game (e.g., baseball, basketball, football, soccer, tennis, etc.), age rating of content (e.g., G, PG-13, etc.), or any other grouping of content. As described further below, the processor 205 may initially analyze content and/or caption data by identifying a category of the content (e.g., sports, movies, television series) and subsequently process the caption data in a manner specific to the identified category (e.g., sports may have twenty characteristics directed to identifying type of sport, teams, players, level, etc., whereas television series may have forty characteristics directed to identifying the subject, characters, intended viewer age, reading level, genre, etc.).

The processor 205 may start, at step 701, by receiving a command from an input device 203 or other input to a processor 205 (shown in FIG. 2). The command may include, for example, a request for content, a wake up signal, powering on the device 200, or any other indication that the device 200 may be receiving content for analysis. At step 702, content, caption data, or other data may be received, such as from a network 202 (e.g., via a network input/output 204), a RAM 208a, a ROM 208b, a removable media 210, a hard drive 211, or an input device 203 (e.g., a control stream via a selection input/output 206).

At step 703, an initial analysis of the received data (e.g., identification in metadata of a category of the content) may be performed. For this initial analysis, the processor 205 may determine whether content is part of a cluster group, and if so, proceed to step 704, where the processor 205 may determine the cluster group for the content (e.g., comparison of a language-level metric of a portion of content with a group of signatures). In this way, a metric may be determined in an efficient manner, whereby prior data from analysis of content for a cluster group may be applied to a metric for newly identified content that is determined to belong to the same cluster group.

If no cluster group is identified, then, at step 709, the processor 205 may determine whether to continue by returning to step 702 or end at step 710. For example, at step 709, the processor 205 could wait for a period of time (e.g., 30 seconds, 1 minute, 2 minutes, or any other period), before returning step 702 if it is determined that an indicator is present in content that may indicate it is a member of a cluster group. As another example, at step 709, the processor 205 could return to step 702 if a television channel is changed, or if a program is determined to have concluded and a new program has started. If no cluster group is identified, and if the processor 205 determines that the process should not continue, the process may end at step 710.

After determining a cluster group at step 704, the processor 205 may analyze content and/or caption data by using instructions that may include any form of data specific to the identified cluster group, at step 705. For example, the processor 205 may receive instructions specific to the identified cluster group via a cluster group instructions source 706, which may include, e.g., a RAM 208a, a ROM 208b, a removable media 210, a hard drive 211, an input device 203, and/or a device in network 202. Some cluster group instructions may be similar to or the same as instructions for other cluster groups, or may be unique to a specific cluster group. As an example, instructions for analyzing a sports game may be directed to fewer characteristics (e.g., type of sport, teams, players, coaches, league, etc.) than instructions for analyzing a television show (e.g., genre, title of show, topic of episode, age rating, actors, characters, reading level, complexity level, degree of similarity with other shows, etc.). By providing specific instructions for a cluster group, analysis of the content and caption data having an identified cluster group may be performed faster and with improved accuracy. For example, if a sports game is correctly identified as a sports game, then a reading level analysis may be unnecessary and may be excluded to expedite the analysis. That is because a reading level for a sports content item may likely be the same or similar reading level as another game from the same sport and/or team, for which a reading level may already have been determined. As another example, if a television program is correctly identified as being an episode within a series of episodes, analysis may focus more on characteristics that may differ among episodes (e.g., topic of episode) than characteristics that the episode likely has in common with other episodes from that television series (e.g., title, actors, characters). In this way, analysis relating to characteristics that are the same or similar to other content in the same cluster group may be skipped or minimized to increase efficiency, while analysis of differences of the content relative to the cluster group may be performed to enhance the accuracy of a metric.

At step 705, the processor 205 may receive cluster group instructions via a source 706, identify updates for cluster group instructions, and transmit updates to instructions (or updated instructions) to the source 706 for future use. At step 707, the processor 205 may use the cluster group instructions from the source 706 to generate and/or update metrics. For example, cluster group instructions may include instructions specific to a particular cluster group, such as identification of certain characteristics to analyze in the content (e.g., average sentence length, reading level, frequency or speaker change, or number of different speakers) and/or identification of certain words or phrases to locate in the content (e.g., known character in a television series, known athlete on a specific sports team, or unique words or phrases associated with a particular character in a television series) that are specific to the particular cluster group. By providing the cluster group instructions, the content analysis may be customized to content in a particular cluster group to perform analysis more efficiently and/or more accurately, e.g., excluding certain characteristics that are less relevant to the particular cluster group such as people or characters unrelated to the cluster group, and including a finer level of characteristics that are more relevant to the particular cluster group such as particular people or characters associated with the cluster group.

At step 707, the processor 205 may receive metrics via a source 708, which may include, e.g., a RAM 208*a*, a ROM 208*b*, a removable media 210, a hard drive 211, an input device 203, and/or a device in the network 202. The processor 205 may compare the received metrics with results from the analysis of the received content and/or caption data from step 705 (e.g., analysis that reveals the content item had an average sentence length of 12.3 words, average word length of 8.76 letters, and/or a reading level of 6). As an example, if the average reading level for the cluster group containing one-hundred content items for a series is 3, but the analysis yielded a reading level of 8 for one content item, then further analysis could be performed to confirm whether the reading level for the content is correct or should be discounted or disregarded as an anomaly, and/or to confirm whether the content item was correctly identified as belonging to the particular cluster group or should be re-categorized as a member of a different cluster group or as not a member of any known cluster group. As another example, if analysis in step 705 included only a subset of characteristics (e.g., identification of characters), then other characteristics of the cluster group (e.g., average sentence length and/or average word length) may be associated with that content to provide a more detailed metric for the content. Additionally or alternatively, if a metric is associated with a particular user (e.g., a viewing metric), and the processor 205 determines that the same user is viewing or has requested content that is being analyzed at step 707 (e.g., as may be determined by the process described above with respect to device activation step 301 of FIG. 3), then the processor 205 may determine whether to update the metric, and if so, to what extent. For example, the processor 205 may update a user's viewing metric by adding or averaging the characteristics of the particular content analyzed with an existing viewing metric for the user previously stored in a metric source 708. The processor may transmit an update, or an updated metric, to the metrics source 708. Additionally or alternatively, at step 707, the processor 205 may generate one or more new metrics based on the content and/or caption data. As an example, a new metric may include information about content that was not previously analyzed (e.g., by the processor 205) or content that does not otherwise already have a metric in the source 708. After generating and/or updating one or more metrics at step 709, the processor 205 may determine whether to continue (e.g., if a user selects new content that is to be analyzed), by returning to step 702, or end at step 710.

The cluster group data may be stored in a memory (e.g., one or more of a RAM 208*a*, a ROM 208*b*, a removable media 210, or a hard drive 211) as output data comprising metadata associated with the content, or stored remotely (e.g., via a network 202). The output data may also include data from an input device 203 via a content selection input/output 206, which may include any type of input/output control for receiving communications from the input device 203 and, based on those communications, provide corresponding instructions to the processor 205.

Figure 8:
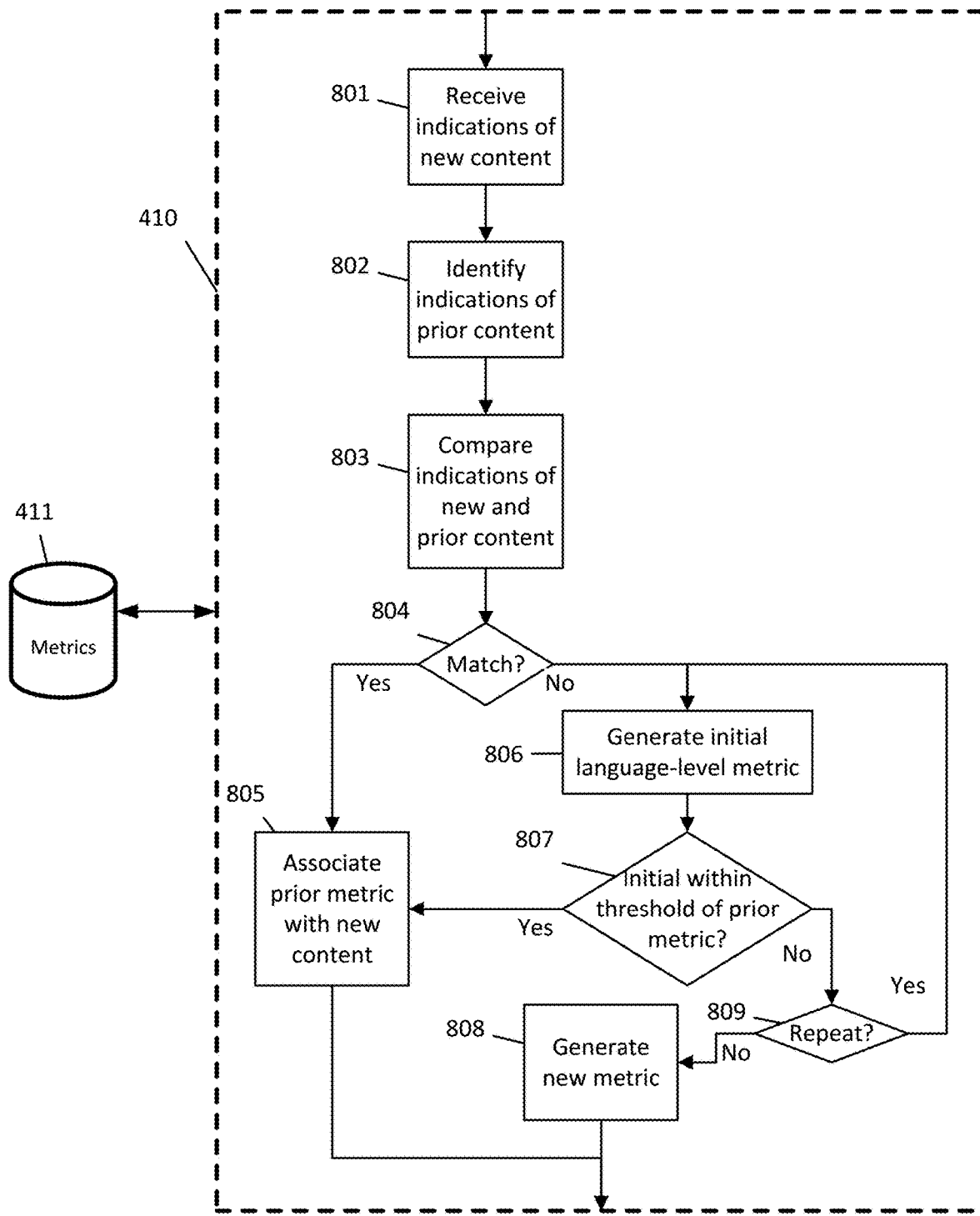
FIG. 8 is a flowchart summarizing example processes for a content recommendation system associating metrics with duplicate content that may be implemented in connection with a content delivery system.

FIG. 8 is a flowchart summarizing example processes for language-level content recommendations that may be performed in addition or in the alternative to the processes described above regarding FIG. 4, whereby duplicate content may be identified prior to complete analysis of caption data associated with content. Step 410 and a metric source 411 in FIG. 4 correspond to step 410 and metric source 411 shown in FIG. 8, respectively, and the corresponding description of FIG. 4 also applies to FIG. 8 and are incorporated by reference here. Returning to FIG. 8, analyzing caption data to generate or update metrics (e.g., step 410) may account for duplicate content to provide greater efficiency in analyzing content and providing content recommendations. By identifying duplicate caption data before proceeding with full analysis of caption data for metrics, a system may avoid having to fully process all of the data associated with content multiple times. For example, a television network could have one video stream being played by a first network affiliate in one region, and the same video stream being played by a second network affiliate in another region. This may occur, for example, if a video stream with national interest is played by a network affiliate on a news program in New York at prime time on the Eastern time zone, and the same video stream is played by a different network affiliate in California a few hours later during prime time on the Pacific time zone. Instead of performing the same language-level metric analysis on both video streams, identifying them as duplicates may provide efficiencies such as reduced processing power, reduced storage requirements, and increased availability of language-level metrics.

In the two affiliate example above, the device 200 (described above regarding FIG. 2) could be located at a television network that may receive indications of potentially new content (e.g., step 801) from a content source at a network 202. As an example, the indications may include a content or program identifier (ID), title, description, or summary. Step 801 may be performed after step 406 of FIG. 4, described above. Additionally or alternatively, step 801 may be performed prior to, at the same time as, or at substantially the same time as step 406 of FIG. 4.

After receiving indications of potentially new content, by using data from a metrics source 411, at step 802, indications of prior content may be identified (e.g., by comparing the received indications with a list of content identifiers for television program episodes or other content that have already undergone a metric analysis such as described here), where prior content corresponds to content that was previously analyzed to generate a language-level metric. The indication of the potentially new content and the indication of the prior content may be compared, at step 803. If the comparison results in a match, at step 804, such that the new content is determined to be duplicative of prior content, then the language-level metric associated with the duplicative prior content is additionally associated with the new content, at step 805 (e.g., a pointer may be generated and associated with both the prior content and the duplicative content, or the metric associated with the duplicative content may be duplicated and associated with the duplicate content). If the comparison in step 803 does not result in a match at step 804, then an initial language-level metric may be generated, at step 806.

At step 806, the initial language-level metric may be generated by analyzing an initial portion of the potentially new content, such as the first 15 seconds, 30 seconds, or 1 minute of content; or the first sentence, first five sentences, or other initial subset of the potentially new content. If the initial language-level metric is within a predetermined threshold of any prior language-level metrics (e.g., stored in metric source 411), determined at step 807, then the language-level metric associated with the prior content is associated with the new content, at step 805. If the initial language-level metric is not within a predetermined threshold of any prior language-level metric, then the content may be determined to be new and a new language-level metric may be generated by analyzing a larger portion of the content in the manner described above with respect to FIG. 4 and step 410. As another example, a word-for-word comparison may be made between words of a closed caption associated with a potentially new content and closed captions associated with prior content. If the comparison yields a match (e.g., satisfying a threshold such as 95%, 99%, 99.99% or another percentage of matching word-for-word closed captions, to account for potential errors that could prevent a 100% match), then the language-level metric associated with the prior content is associated with the new content, at step 805. If the comparison does not yield a match (e.g., not satisfying a threshold such as above), then the content may be determined to be new and a new language-level metric may be generated by analyzing a larger portion of the content in the manner described above with respect to FIG. 4 and step 410.

At step 809, it may be determined whether steps 806 and 807 should be performed again, e.g., using a larger portion of the potentially new content. For example, if step 806 generates an initial language-level metric based on an analysis of a small amount of content (e.g., less than 60 seconds, less than 30 seconds, or less than 15 seconds) that is not within a threshold of a prior metric, steps 806 and 807 could be repeated using an amount of content greater than the amount used to generate an initial language-level metric in the prior step 806 (e.g., more than 60 seconds, more than 1 minute, or more than 2 minutes). Step 809 may also be determined to repeat a fixed number of times before determining that the content is new content and proceeding to step 808 to generate a new metric, or step 809 may not need to be performed. After either step 805 or 808, the process continues with step 412, described above with respect to FIG. 4.

As described above regarding FIG. 8, the language-level metrics from a first video stream may be associated with a second video stream (e.g., including, in a metric for the second video stream, an identifier or address to a metric for the first video stream, or copying the content of the metric for the first video stream into a metric for the second video stream), such as in the two affiliate example provided above. A device at network 202 may include both a content source 405 and a metrics source 411, or the content source 405 and the metrics source 411 may be located in different devices in the network 100. Either or both of the content source 405 and the metrics source 411 may be stored in memory in a device 200 (e.g., in one or more of a RAM 208a, a ROM 208b, a removable media 210, or a hard drive 211) or in any other memory or location.

Using the steps in FIG. 8, as part of an abbreviated language-level metric analysis, a processor (e.g., the processor 205) may determine whether content under consideration is a duplicate of other content already having associated language-level metrics (e.g., stored in a metrics source 411), and if a duplicate is detected, then the previously generated language-level metrics may be associated with that duplicate content (e.g., at step 805). Additionally or alternatively, at step 805, the duplicate content may be associated with the previously generated metric in a metric source 411. In steps 802-804, the language-level analysis to identify duplicate content of other content already having a language-level metric may include determining a content identifier from metadata or program data associated with the content (e.g., title, description, or alphanumeric identification) and comparing that identifier with identifiers of content in a metrics source 411. As another example, step 806 may include analyzing caption data for an initial time period (e.g., 15 seconds, 30 seconds, or 1 minute) to generate an initial metric and comparing that initial metric with metrics in the metric source 411 to determine, at step 807, whether an exact match or near exact match is present in the metric source (e.g., with characteristics of the initial metric all within a certain percentage, such as 0.5%, 1%, or 2%, of the value for characteristics of a metric of potentially duplicate content).

Duplicate content detection may be performed as follows. For an initial analysis of caption data associated with content (e.g., step 806), a stream signature may be generated and subsequently used to identify duplicate caption data. A stream signature may comprise an average of a plurality of characteristics in a metric, including any of the language-level characteristics described herein. The average may be a "moving average" such that with each additional portion of content analyzed (e.g., via a repeating loop from step 809 back to step 806 and then to step 807), a value associated with each language-level characteristic may be updated to an average of the values for the characteristic. For example, a stream signature may include an "average sentence length" value (e.g., equaling 4.546), an "average named entity frequency value" (e.g., equaling 2.4), and an average value for any other item relating to the caption data. To find duplicate caption streams, moving averages for a stream may be compared (e.g., at step 807), for each iteration of steps 806, 807, and 809, to averages of all other streams stored in a metric source 411. An example is provided in the following pseudo code:

```
Select stream where Average Sentence length > 4.0 and Average
Sentence length < 5.0 and Average named entity frequency > 2.0 and
Average named entity frequency < 3.0
(... and so on ...)
```

In the operation above, all caption streams having certain ranges of average metric values may be identified. For example, the above pseudo code may be used to identify all caption streams from a metric source 411 that have an average sentence length between four and five, and an average named entity frequency between two and three (e.g., average number of between two and three proper nouns in a particular portion of a caption stream). Selecting a range of values using the greater and less than operators, such as shown above, may ensure that matches are found even if individual caption streams may contain signal glitches and other small differences. Duplicate caption streams should contain the same average metric values, and thus, an identification of streams satisfying particular ranges of average metric values may be used to identify duplicate caption streams in a quick manner prior to analysis of all caption data for potentially duplicate content. For each iteration of steps 806, 807, and 809, the ranges of average metric values may be narrowed until a single closest metric (or a few closest metrics) may be compared in greater detail with the metric for the potentially new content (e.g., by comparing more characteristics within the metrics). If duplicate caption streams are identified, at step 805, data associated with one or more duplicate caption streams may be associated with the other duplicate caption streams, and vice versa. Using the above processes, efficiencies may be realized, such as reduced subsequent processing and storage of streams that are found to be duplicates of streams already processed or stored.

Using processes described above, as an example, data associated with duplicate caption streams also may be merged with, or disassociated from, data associated with other caption streams. For example, a news content item may contain both local and national streams that may or may not be of interest to a viewer. Data associated with caption streams identified from a national broadcast of news content, that may be previously generated or live, may be combined with data associated with caption streams from a local broadcast of similar news content (e.g., an identifier or address to a metric or other data for a national video stream may be stored in an identifier or address to a metric or data for a local video stream, or the content of a metric or other data for a national video stream may be copied into content for a metric or other data for a local video stream). Additionally or alternatively, data associated with caption streams from nationally broadcasted advertisements could be removed or remain separated (e.g., stored in a single instance in a metrics source 411) from data associated with caption streams (e.g., stored in a content source 405) from a local broadcast that may not have been previously generated. Identification of duplicate content and generation of stream signatures may include various aspects in addition or in the alternative to those described above. For example, a content ID or other identification of content may be used and associated with content, such as described above with respect to steps 801-804. If a stream signature for content is generated, language-level metrics may be assigned to that content (e.g., from step 807 to step 805) as well as any other content having the same or similar stream signature within a certain threshold or range (e.g., according to a threshold established at step 807 described above). Using the above processes, data storage of language-level metrics may be minimized.

The methods for generating language-level metrics also may be applied with a variety of methods for advertisement detection and removal, which may provide caption streams for use in generating language-level metrics that exclude advertisements. More generally, content that is commercial (e.g., advertisements) may be distinguished from non-commercial content (e.g., requested content items). This may be desirable because language-level metrics may vary significantly between a content item, such as a television program, and commercials inserted at breaks in the content item. As an example, a financial commercial inadvertently placed during a break in a cartoon television show could significantly alter the language-level metrics of the show if caption data from both are included in the generation of metrics. As another example, an English-language commercial placed during a break in a non-English language content item could likewise significantly alter language-level metrics if the analysis of caption data from the content does not exclude caption data associated with commercials. Thus, it may be preferable to perform separate language-level metric analyses for commercial and non-commercial content, or exclude caption data of commercial content altogether, to ensure that commercial breaks, which the user typically does not select or prefer to view, do not skew the language-level metrics for the non-commercial content that the user selects to view. Additionally or alternatively, caption data associated with content may be pre-processed (e.g., processed prior to a user requesting to view the content) so as to separately identify commercial content from non-commercial content, and thereby provide metrics having greater accuracy than metrics that are based on both commercial and non-commercial content. In examples with such advertisement detection and removal, it may be preferable to perform metric analysis (e.g., step 410 of FIG. 4) prior to content selection (e.g., step 404) and receiving content and caption data (e.g., step 406). For example, metric analysis may be performed at a device in the network 202 (e.g., at a central office 103 or an external network 109), prior to a device 200 selecting content. In this way, the appropriateness of advertisements with certain content items may be determined in advance, and desired advertisements may be received with content and caption data (e.g., at step 406).

Figure 9:
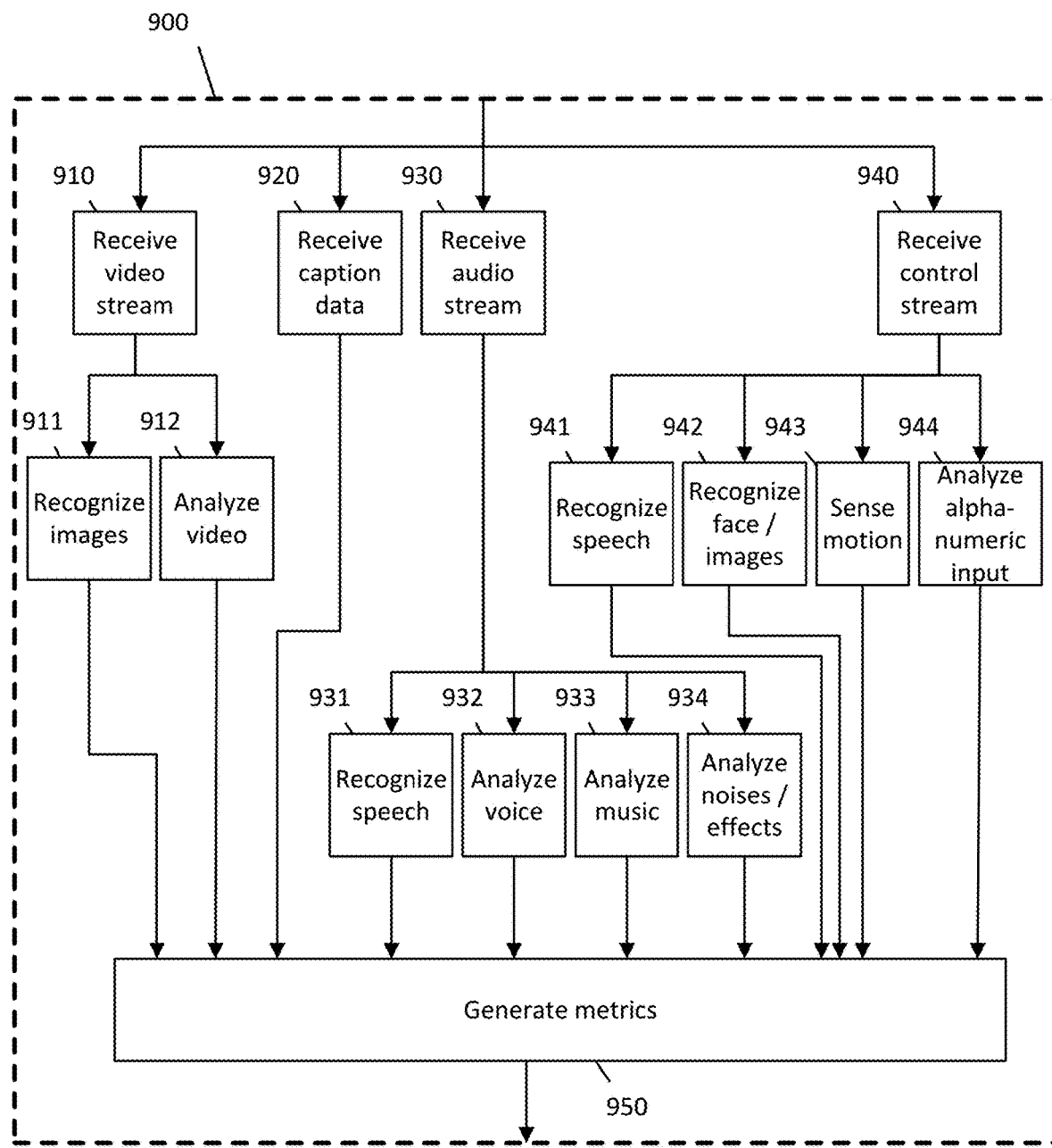
FIG. 9 is a flowchart summarizing example processes for a content recommendation system using video, audio, caption data, and control inputs that may be implemented in connection with a content delivery system.

FIG. 9 is a flowchart summarizing example processes for language-level analysis, applying to data in addition to or in the alternative of caption data, identified at step 900. Step 900 of FIG. 9 may correspond to step 410 of FIG. 4, steps 610-A and 610-B of FIG. 6, and/or step 808 of FIG. 8 for analyzing data to generate and/or update language-level metrics, as described above and incorporated by reference here. Additionally, step 950 of FIG. 9 may generate a language-level metrics 501 and a viewing metrics 511 described above regarding FIG. 5 and incorporated by reference here. As examples, any of the characteristics of audio (e.g., output from steps 931-934), video (e.g., output from steps 911-912), caption data (e.g., output from step 920), and control streams (e.g., output from steps 941-944) described below regarding processes of FIG. 9 may be a characteristic of the metrics 501 and 511 described above regarding FIG. 5. For example, audio data may be received such as in an audio stream or audio channel (step 930) and analyzed (steps 931-934) to identify information about the data that may be used to generate or update metrics (step 950) in addition to or in the alternative to caption data (received at step 920). These steps 930-935 may be in real-time, near real-time, prior to content delivery, or after content delivery such as in post-processing of an audio channel. Additionally, the processes of determining additional content 412 and recommending additional content 413, described above with respect to FIG. 4, also may be performed following the generation or updating of one or more metrics in step 950.

In step 931, speech recognition may be applied to audio for generation of language-level metrics, including, e.g., producing text of the content in place of or to supplement caption data for language-level analysis. Additionally, other audio analysis methods may be applied to audio to identify common signatures among content such as voice recognition of a particular speaker (e.g., step 932), tonal recognition of a music track (e.g., step 933) or sound effect (e.g., step 934), or inflections in voices (e.g., step 932). Characteristics from an audio stream may be used for either or both of the language-level metric 501 (e.g., relating to the content selected or viewed), and the viewing metric 511 (e.g., relating to the user who selected or viewed the content). For example, if the voice of a speaker is identified (e.g., at step 932), a textual output of the speaker's name may be provided for generating metrics (e.g., step 950) where the identification of the speaker may be informative of the content (e.g., actor, political figure, sports player) useful for the language-level metric 501 and, in turn, potentially informative of the interests of the user who selected and/or viewed the content useful for the viewing metric 511. As another example, recognition of a music track in the background of a content item (e.g., television show, streaming video, etc.) may be used to identify music that may be of interest to the user who selected and/or viewed the content (e.g., useful for the viewing metric 511), and subsequent advertisements to the user could include songs, albums, or other music from the performing artists or composers previously identified in the background of the content item (e.g., from step 933). As yet another example, theme music associated with a television show may be identified in content, at step 933, using an audio channel associated with the content, and a previously identified signature for that show may then be associated with the content, at step 950. Background music could also be analyzed at step 933 to provide information about the content, such as dramatic music indicative of dramatic or suspenseful content, or classical music indicative of more sophisticated content, that may be applied to a language-level metric 501. As another example, at step 934, non-verbal characteristics or sounds such as speeding cars may be identified in audio and a signature for action movies or auto racing sporting events may be associated with the content. In another example, at step 932, voice recognition may be used to identify a particular speaker in the content such as well-known actor or actress, news anchorperson, or athlete, and a signature associated with that person may be applied to the content. As yet another example, an analysis of audio that indicates little or no voice inflections (e.g., step 932) could be indicative of a documentary, and a corresponding signature for documentaries could be associated with the content. Any number of verbal or non-verbal characteristics of audio may be analyzed to provide information that may help characterize content (e.g., for inclusion as one or more characteristics in a language-level metric 501), and in turn, identify users or groups of users of a corresponding interest that are most likely to have interest in the content (e.g., using the viewing metrics 511). The audio stream and the caption data may be received (at steps 930 and 920, respectively) by the processor 205 (described above regarding FIG. 2) via one or more of the inputs from a network input/output 204, a RAM 208a, a ROM 208b, a removable media 210, and/or a hard drive 211. Steps 931-934 and 950 may be performed by the processor 205.

User input data, such as in the form of a control stream, may be received, at step 940, and analyzed at steps 941-944 for generating metrics. For example, data may be received at step 940 in the form of voice commands (e.g., step 941) in a control stream that may be used with a voice remote for various operations, such as channel or content selection, recording, pausing, playing, searching, or other functions. At step 941, the user's voice may be analyzed with respect to caption data and audio. For example, analysis of a user's commands may include detection of profanity, accents or language, gender, approximate age group, common phrases or slang apart from actual commands, or other language-level elements. As one example, frequent occurrences of profanity in a user's voice command may indicate that the user may be more open to receiving a recommendation for content having a high level of profanity, and may be included as a characteristic in the user's viewing metric 511. As another example, a detection of a regional accent of a user may also be included as a characteristic of a viewing metric 511 as it may suggest that the user may have interests similar to a cluster group of users from the same region (e.g., local sports, music, events, etc.), even if that particular user is viewing content from a location far away from that region.

At step 941, a user's voice command also may be analyzed to identify a particular user among a household or other group of users, and at step 950 corresponding viewing metrics 511 may be associated with the identified user. A user's commands via other methods, including non-verbal commands, such as textual or button inputs for receiving data (at step 944) or motion sensing of hand movements (at step 943) or facial observations (at step 942) also may be analyzed. For example, users that change channels more frequently than others could have more interest in fast-paced political or financial news content items or action movies than they may have in documentaries and dramas more suited for longer attention spans, and corresponding signatures may be applied based on such user inputs. User textual inputs (at step 944), such as search phrases entered by a user in an interface to search for content, also may be analyzed (at step 950) for language-level elements in the manner described herein for caption data. Metrics, including language-level metrics, may be generated based on these inputs and updated with subsequent user input (at step 950). Input data from multiple users also may be combined to provide clustered profiles for content recommendations. User input data may be provided using the input device 203, in communication with the selection input/output 206 of the device 200 described above regarding FIG. 2. Steps 941-944 and 950 may be performed by the processor 205, receiving the user input data via the selection input/output 206.

Video data associated with content may be received (at step 910) and analyzed (at steps 911-912). For example, video data may be analyzed to provide situational or other non-textual linguistics that may not be apparent in audio or closed captions, or that may enhance the analysis of audio or closed captions. In some examples, image recognition could be used to identify people, places, or things that could be relevant to the user's interests and included as characteristics in the viewing metrics 511 in addition or in the alternative to characteristics of the content in language-level metrics 501 (step 911). For example, the presence and frequency of animals in video content could assist in identifying the content as a wildlife documentary, or the presence and frequency of landmarks in video content could assist in identifying the content as a travel content item category. As another example, video analysis may be used to distinguish cartoons from non-cartoon content, or identify age appropriateness of content such as identification of violent content (e.g., weapons, explosions, gun fire, etc.) that a parent may want to prevent a child from being able to view (step 912). Video analysis may provide other information relating to changes such as changes in scene (e.g., the rate of scene changes) or transitions to a commercial or different content items (e.g., identification of commercial content and non-commercial content), that may be useful in providing metrics (at step 912). Any other analysis of video data may be performed to provide information that may help characterize content (e.g., for the language-level metrics 501), and in turn, identify users or groups of users of a corresponding interest that are most likely to have interest in the content (e.g., for the viewing metrics 511). The video stream may be received (at step 910) by the processor 205 (described above regarding FIG. 2) via one or more of the inputs from the network input/output 204, a RAM 208a, a ROM 208b, a removable media 210, and/or a hard drive 211. Steps 911-912 and 950 may be performed by the processor 205

The processes described above include analysis of content and associated caption data for generating metrics, including the language-level metrics 501 described with respect to FIG. 5. Table 2 below includes several examples of language-level elements that may be included as characteristics in the language-level metrics 501.

TABLE 2

| Element | Examples: |
|---|---|
| Sentence length: | Longer than average sentences (e.g., more than 15, 20, 25, or 30 words per sentence) may be an indication of a hard news content item; shorter sentences (e.g., less than 15, 12, 10, or 8 words per sentence) may be an indication of appropriateness for children. |
| Reading level: | Advanced reading level (e.g., 8, 9, or 10 on a scale of 1 to 10) may be an indication of a sophisticated adult user; low reading level (e.g., 3, 2, or 1 on a scale of 1 to 10) may be an indication of a child user having an approximate age corresponding to an identified reading level. |
| Named entities/proper nouns: | High frequency of named entities (e.g., more than 0.2, 0.5, 0.8, 1.0, or 1.2 named entities per sentence) may be an indication of a documentary, travel, or news content item. |
| Certain phrases, words, or slang: | Presence of certain phrases (e.g., "no way," "like, seriously?", "hey") may identify audience that uses similar phrases, e.g., regional or age-based. |
| Profanity: | Presence of profanity is a strong indication that the target audience is not children, and that the content is not likely to be a content item where profanity is not usually found, such as a documentary, travel, or news content item. This may be particularly useful to correct incorrectly labeled ratings of content, or to provide a mechanism for rating or filtering streaming video or other content that may lack a reliable rating system. |
| Music indicator: | Text nearby "♪" or other symbol may provide additional information about the symbol, such as "classical," which may be indicative of more sophisticated content, or "dramatic music" may be indicative of dramatic or suspenseful content. |
| Cheers and applause: | May be shown by, e.g., "[Cheers and Applause]" or other indicator, showing that cheering, clapping, or general audience remarks is included. Inclusion of cheers and applause may be an indication that the content is recorded with a live audience. Recognition of repeated patterns cheers and applause, or patterns in audio associated with cheers and applause, may be an indication of content having been previously recorded or an indication of an artificial "laugh track" or other audience noise, such as often found in a sitcom. |
| Speaker change: | May be shown by, e.g., ">>" or similar indicator, showing a change in speaker. Frequent speaker changes, e.g., at a fast pace such as a speaker change at an average of 5, 10, 15, or 20 seconds, may be an indication of greater complexity in content. No speaker changes may be an indication of documentary or instructional content by a single narrator. Speaker changes following certain language patterns such as common lines of questioning (e.g., following words "Who", "What", "Where", "Why" and "How"), may be indicative of a news content item or game shows. |
| Web addresses: | Text before or after "http://," "www.," or ".com" may provide information relating to the source or content of the content item, such as referring to a website with a description of the content item that may be used to indicate likely target audiences. |
| Hashtags: | Presence of hashtag, "#," may be an indication of an informal content item, such as a small distribution local news content item or real-time streaming content. |
| Currency: | References to currency may be an indication of a financial or hard news content item. |
| Dates: | Presence of dates may be an indication of a documentary or a scene change in a content item. |
| Numbers: | References to numbers may be an indication of a financial or educational content item. |
| Special characters: | Presence of "!" may be an indication of an action or drama movie or other content item. |
| Character combinations: | Combinations of certain letters, such as "ABC", numbers "123," or vowel letters "AEIOU" may be an indication of an educational content item for young children. |

TABLE 2-continued

| Element | Examples: |
| --- | --- |
| Language | If caption data contains non-English language, or is identified as comprising a particular non-English language, it may inform metrics that may emphasize content of certain languages. |

The above are non-exhaustive examples of some language-level elements that may be analyzed to provide language-level metrics. Any combination of language-level elements may be analyzed, including those set forth above, as well as any other type of element that may be identified in caption data, audio, video, user input, or any other data, to provide metrics in accordance with this disclosure. Any metric referred to herein, including in the figures, may include a language-level metric, a viewing metric, or other type of metric capable of providing information that may help characterize content, and in turn, identify users or groups of users of a corresponding interest that are most likely to have interest in the content.

Although examples are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this disclosure though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
processing, by a computing device, a digital caption stream to determine speaker changes associated with an audio stream of a content item that has been selected by a user for future output, wherein the processing occurs prior to output of the content item;
determining, based on the speaker changes and linguistic characteristics of caption streams associated with a plurality of different content items that have not yet been output to the user,
a recommended plurality of content items; and
sending an indication of the recommended plurality of content items.

2. The method of claim 1, wherein the sending the indication of the recommended plurality of content items comprises:
sending, to a device associated with the user, a degree of similarity between:
the plurality of different content items that have not yet been output to the user; and
the content item that has been selected by the user for future output.

3. The method of claim 1, further comprising:
determining, based on the speaker changes and the linguistic characteristics of the caption streams associated with the plurality of different content items that have not yet been output to the user, a degree of similarity between:
a portion of each of the recommended plurality of content items; and
the content item that has been selected by the user for future output; and
wherein the sending the indication comprises sending, based on a determination that the degree of similarity satisfies a threshold, the indication of the recommended plurality of content items.

4. The method of claim 1, wherein the determining the recommended plurality of content items is further based on a similarity between:
respective grammatical complexities of the recommended plurality of content items; and
grammatical complexity of the content item that has been selected by the user for future output.

5. The method of claim 1, wherein the recommended plurality of content items comprises a plurality of different television shows or a plurality of different movies.

6. The method of claim 1, wherein the determining the recommended plurality of content items is further based on one or more of grammatical complexity, reading level, or sentence lengths determined based on processing the digital caption stream.

7. The method of claim 1, further comprising:
determining voice data received from the user,
wherein the determining the recommended plurality of content items is further based on linguistic characteristics of the voice data.

8. The method of claim 1, wherein the determining the recommended plurality of content items is further based on a degree of profanity within:
the digital caption stream; and
voice commands received from the user.

9. The method of claim 1, wherein the speaker changes are based on a time between different speakers speaking in the digital caption stream.

10. The method of claim 1, wherein the speaker changes comprise an average frequency of speaker changes within the content item that has been selected by the user for future output.

11. The method of claim 1, wherein determining the recommended plurality of content items comprises:
monitoring speaker changes in caption streams of a plurality of currently-transmitted content streams; and
updating, based on the monitoring, the linguistic characteristics.

12. The method of claim 1, wherein the digital caption stream is encrypted, and wherein processing the digital caption stream comprises decrypting the digital caption stream.

13. The method of claim 1, further comprising:
receiving, from a source different from the computing device, the digital caption stream; and
decoding the digital caption stream.

14. The method of claim 1, further comprising:
receiving a user selection of a recommended content item from the recommended plurality of content items;
retrieving the recommended content item; and
sending the recommended content item.

15. A method comprising:
   determining, by a computing device, a first video program selected by a user for future output;
   processing, prior to output of the first video program, a digital caption stream associated with the first video program to determine a first grammatical complexity based on a quantity of different speakers;
   determining a recommended video program having a second grammatical complexity similar to the first grammatical complexity; and
   sending an indication of the recommended video program.

16. The method of claim 15, wherein the sending the indication of the recommended video program comprises sending, to a device associated with the user, a degree of similarity between:
   the second grammatical complexity; and
   the first grammatical complexity.

17. The method of claim 15, further comprising:
   determining a degree of similarity between:
      grammatical complexity of a portion of the recommended video program; and
      the first grammatical complexity; and
   wherein the sending the indication comprises sending, based on a determination that the degree of similarity satisfies a threshold, the indication of the recommended video program.

18. The method of claim 15, wherein the determining the first grammatical complexity is further based on a reading level of determined based on processing the digital caption stream.

19. The method of claim 15, further comprising:
   determining user characteristics based on user commands comprising one or more of:
      a textual or button input;
      changing of contents or services;
      motion sensing of a body movement; or
      recognition of a facial expression,
   wherein the determining the recommended video program is based on the user characteristics.

20. The method of claim 15, wherein the first grammatical complexity is based on a sentence length or a quantity of complex words of voice commands spoken by the user.

21. The method of claim 15, wherein the first grammatical complexity is further based on an average frequency of speaker changes within the first video program.

22. A method comprising:
   determining, by a computing device, a first content item selected by a user for future output;
   processing, prior to output of the first content item, a digital caption stream associated with the first content item to determine a first reading level based on a time duration during which different speakers speak within a portion of the first content item;
   determining a recommended content item having a second reading level similar to the first reading level; and
   sending an indication of the recommended content item.

23. The method of claim 22, further comprising, sending, to a device associated with the user, a degree of similarity between:
   the second reading level; and
   the first reading level.

24. The method of claim 22, further comprising:
   determining a degree of similarity between:
      a reading level of a portion of the recommended content item; and
      the first reading level; and
   wherein the sending the indication comprises sending, based on a determination that the degree of similarity satisfies a threshold, the indication of the recommended content item.

25. The method of claim 22, wherein the determining the first reading level is further based on sentence lengths associated with the portion of the first content item.

26. The method of claim 22, further comprising:
   determining an advertisement having a reading level similar to the first reading level; and
   sending the advertisement for display at a device associated with the user.

27. The method of claim 22, further comprising:
   determining that the first content item belongs to a cluster group of content items having reading levels similar to the first reading level,
   wherein the determining the recommended content item is further based on the reading levels of the cluster group of content items.

28. The method of claim 22, wherein the first reading level is further based on a quantity of different speakers within the portion of the first content item.

* * * * *

UNITED STATES PATENT AND TRADEMARK OFFICE
CERTIFICATE OF CORRECTION

| | |
|---|---|
| PATENT NO. | : 11,270,071 B2 |
| APPLICATION NO. | : 15/856585 |
| DATED | : March 8, 2022 |
| INVENTOR(S) | : Walsh |

It is certified that error appears in the above-identified patent and that said Letters Patent is hereby corrected as shown below:

In the Specification

Column 17, Detailed Description, Line 23:
After "FIG. 5)", insert --.--

Column 33, Detailed Description, Line 2:
After "205", insert --.--

In the Claims

Column 37, Claim 18, Line 29:
After "level", delete "of"

Signed and Sealed this
Eleventh Day of July, 2023

Katherine Kelly Vidal
*Director of the United States Patent and Trademark Office*